United States Patent
Thomas et al.

(10) Patent No.: US 6,313,273 B1
(45) Date of Patent: Nov. 6, 2001

(54) SOY PROTEINS AND METHODS FOR THEIR PRODUCTION

(75) Inventors: Ronald L. Thomas, Clemson, SC (US); Louis I. Ndife, Columbus, OH (US); Hilary Shallo, Naperville, IL (US); Lynn P. Nelles, St. Charles, MO (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 09/382,966

(22) Filed: Aug. 25, 1999

(51) Int. Cl.$^7$ .............................. A23J 1/14; A61K 35/78; A61K 35/80; C07K 14/00

(52) U.S. Cl. ......................... 530/378; 530/370; 530/372; 530/376; 530/377; 530/378; 530/414; 530/418

(58) Field of Search .................................... 530/370, 372, 530/376, 377, 378, 414, 418; 514/2

(56) References Cited

U.S. PATENT DOCUMENTS

| | | | |
|---|---|---|---|
| 4,478,940 | * 10/1984 | Alder-Nissen et al. | 435/209 |
| 4,897,465 | * 1/1990 | Cordle et al. | 530/387 |
| 5,658,714 | * 8/1997 | Westfall et al. | 530/378 |

OTHER PUBLICATIONS

Sandberg, et al., Inositol phosphates with different numbers of phosphate groups influence iron absorption in humans[1–3] *Am J Clin Nutri* 1999;70:240–6.

Hurrell, et al., A comparison of iron absorption in adults and infants consuming identical infant formulas *British Journal of Nutrition* 1988;79:31–36.

Espghan Abstracts, *J Pediatr Gastroenterol Nutr.* vol. 23, No. 5, May 1999, Abstract No. 40.

Lönnerdal, et al, Effect of reducing the phytate content and of partially hydrolyzing the protein in soy formula on zinc and copper absorption and status in infant rhesus monkeys and rat pups[1,2] *Am J Clin Nutr* 1999;69:490–6.

Abstract from Federal Proceedings vol. 35, No. 3, Mar. 1, 1976 p. 744.

Abstract from *Amer J Clinic Nutr* 1999;51.

Hurrell, et al., Soy protein, phytate, and iron absorption in humans[1–3], *Am J Clin Nutr* 1992;56:573–8.

Rudloff, et al., Calcium and zinc retention from protein hydrolysate formulas in suckling rhesus monkeys, *AJDC* vol. 146, May 1992.

Lynch, et al., Inhibitory effect of a soybean–protein—related moiety on iron absorption in human[1–3], *Am J Clin Nutr* 1994;60:567–72.

Reddy, et al., The influence of different protein sources on phytate inhibition of nonheme–iron absorption in humans[1,2], *Am J Clin Nutr* 1996;63:203–7.

Anno, et al., Enzymatic elimination of phytate in soybean milk, *Nippon Shokuhin Kogyo Gakkalshi* 1985; 32(3): 174–180.

Arai, et al., n–Hexanal and some volatile alcohols: Their distribution in raw soybean tissues and formation in crude soy protein concentrate by Lipoxygenase, *Agricultural and Biological Chemistry* 1970; 34(9): 1420–1423.

Arai, et al., Studies on flavor compounds in soybean part IV. Some evidence for occurance of protein–flavor binding, *Agricultural and Biological Chemistry* 1970; 34(10): 1569–1573.

Baker, et al., Extraction of defatted soybean flours and flakes with aqueous alcohols: Evaluation of flavor and selected properties, *Journal of Agricultural and Food Chemistry* 1979; 27(5): 969–979.

Brooks, et al., A modified method for total carbohydrate analysis of glucose syrups and other starch degradation products, *Cereal Chemistry* 1986; 63(5): 465–466.

Cheryan, Application of membrane processing in the soy protein industry, *INTSOY–Int–Soybean–Prog–Ser* 1983; 25: 102–107.

Davies, et al., Flavor improvement of soybean preparations by genetic removal of Lipoxygenase–2, *Journal of the American Oil Chemical Society* 1987; 64(10): 1428–1433.

De Rahm, et al., Phytate–protein interactions in soybean extracts and low–phytate soy protein products, *Journal of Food Science* 1979; 44(2): 596–600.

Eldridge, et al., Alcohol treatment of soybeans and soybean protein products, *Cereal Chemistry* 1977; 54(6): 1229–1237.

Fujimaki, et al., Applying proteolytic enzymes of soybean, *Food Technology* 1968; 22: 889–893.

Gibson, et al., Phytases and their action on phytic acid, *Plant Biology* 1990; 9: 77–92.

Harland, et al., Phytate: A good or bad food component?, *Nutrition Research* 1995; 15(5): 733–754.

Kalbrener, et al., Sensory evaluation of commercial soy flours, concentrates and isolates, *Cereal Chemistry* 1971; 48: 595–600.

(List continued on next page.)

*Primary Examiner*—Karen Cochrane Carlson
*Assistant Examiner*—Stephen Tu
(74) *Attorney, Agent, or Firm*—J. Michael Dixon

(57) ABSTRACT

A high quality soy protein concentrate (SPC) was produced by a process of enzyme treatment combined with ultrafiltration. Soy flour, the starting material, was enzymatically treated with commercial pectinases and diafiltered with a porous stainless steel ultrafiltration system. The resulting product had reduced levels of physic acid and nucleic acids due to contaminant phytase and nuclease activity in the pectinase enzymes. The functionality of the SPC was improved due to increased solubility compared to conventional soy isolates produced by acid precipitation. High performance liquid chromatography gel filtration profiles indicated that the proteins in the SPC remained intact. The SPC also had reduced flavor when compared to the original soy flour according to gas chromatography flavor profiles and sensory evaluation.

17 Claims, 12 Drawing Sheets

OTHER PUBLICATIONS

Kon, et al., pH adjustment control of oxidative off–flavors during grinding of raw legume seeds, *Journal of Food Science* 1970; 35: 343–345.

Maga, A review of flavor investigations associated with the soy products raw soybeans, defatted flakes and flours, and isolates, *Journal of Agricultural and Food Chemistry* 1973; 21(5): 864–868.

Maga, Phytate: Its chemistry, occurrence, food interactions, nutritional sugnificance, and methods of analysis, *Journal of Agricultural and Food Chemistry* 1982; 30(1): 1–9.

Omosalye, et al., Low–phytate, full–fat soy protein product by ultrafiltration of aqueous extracts of whole soybeans, *Cereal Chemistry* 1979; 56(2): 58–62.

Omosalye, et al., Ultrafiltration of soybean water extracts: Processing characteristics and yields, *Journal of Food Science* 1979; 44: 1027–1031.

Omosalye, et al., Removal of oligosaccharides from soybean water extracts by ultrafiltration, *Journal of Food Science* 1978; 43: 354–360.

O'Neill, et al., Flavor protein interactions: Characteristics of 2–nonanone binding to isolated soy protein fractions, *Journal of Food Science* 1987; 32(1): 98–101.

Rice, et al., Effect of enzyme inactivation of the extracted soybean meal and oil, *Journal of the American Oil Chemistry Society* 1981; 58: 587–583.

Sessa, et al., Lipid oxidation in full–fat and defatted soybean flakes as related to soybean flavor, *Cereal Chemistry* 1969; 46: 675–686.

Srinivas, et al., Secondary extraciton of soybeans using hexane–acetic acid: Effect on beany flavor removal and physiochemical properties, *Journal of Agricultural and Food Chemistry* 1992; 40: 276–279.

Sutardi, The characteristics of soybean phytase, *Journal of Food Biochemistry* 1986; 10: 197–216.

WIlkens, et al., Effect of processing method on oxidative off–flavors of soybean milk, *Food Technology* 1967; 21: 1630–1633.

Mattick, et al., Identification of a volatile component in soybeans that contributes to the raw bean flavor, *Journal of Agricultural and Food Chemistry* 1969; 17(1): 15–17.

Nichols, et al., Production of soy isolates by ultrafiltration: Factors affecting yield and composition, *Journal of Food Science* 1981: 46: 367–372.

Okubu, et al., Preparation of low–phytate soybean protein isolate and concentrate by ultrafiltration, *Cereal Chemistry* 1975; 52: 263–271.

Honig, et al., (1975) Volatilve components of maturing soybeans. *Creal Chemistry* 52:396–402.

Davidsson, et al., Iron bioavailabililty studies in infants: The influence of phytic acid and ascorbic acid in infant formulas based on soy isolate, *Pedicatric Research*, vol. 36, No. 6, 1994, 816–822.

Mounts, et al. (1987) Processing and Utilzation. In Soybeans: Improvement, Production, and Uses. J.R. Wilcox (Ed.), Madison: *The American Society of Agronomy*. pp. 819–860.

Bednarski, Przem. Ferment. Owocowo–Warzywny (1984) 28(3): 15–18.*

* cited by examiner

SOY FLOUR

DIAFILTERED RETENTATE

PERMEATE

SOY PROTEINS AND METHODS FOR THEIR PRODUCTION

BACKGROUND

Soy proteins are valuable ingredients in foods due to their high nutritional value.

Soy proteins have found wide acceptance in Asia and are one of the principal sources of protein in a traditional Asian diet. Soy protein has not been as widely accepted in North America. Many American consumers object to the flavor of soy.

Raw soybeans and soy flour are characterized by odors described as green, grassy, bitter and beany and are therefore undesirable to many consumers. Volatile compounds contributing to soy flavor have been identified in numerous publications over the past 4 decades. A review of soy flavor (MacLeod, G. & Ames, J., (1988) Soy flavor and its improvement, *CRC Critical Reviews in Food Science and Nutrition*. 27 (4): 219–400) stated that 334 separate volatile compounds had been identified from soybeans, flours, concentrates, isolates, and textured soy proteins. The compounds identified were from the chemical classes of aliphatic hydrocarbons, alicyclic hydrocarbons, terpenoids, aliphatic alcohols, aliphatic aldehydes, aliphatic ketones, alicyclic ester, aliphatic ethers, aliphatic amines, aliphatic nitrile, chlorine containing compounds, benzenoids, sulfur compounds, benzenoids, sulfur compounds, furanoids, thiophenoids, pyrroles, pyridine, pyrazines, and thiazoles.

Specific compounds that have been identified as volatile components contributing to soy flavor include ethyl vinyl ketone, n-hexanol, n-pentanol, n-heptanol, methanol ethanol, ethanal, propanal, acetone, pentane, pentanal, hexanal, n-hexanal, acetaldehyde, acetone, and 2-heptenal.

Volatile components in soy products may be formed from precursors in the soybean. Factors affecting the formation of these compounds are oxygen tension, enzymes, temperature, moisture content and the possible presence of accelerators and/or inhibitors. Lipid oxidation and the effect of heating on carbohydrates and proteins have the greatest effect on the formation of volatile compounds. Minor factors contributing to flavor compounds include thermal decomposition of phenolic acids and thiamin and the degradation of carotenoids (MacLeod & Ames, supra).

Blade, R. J. (1990) Factors influencing endogenous flavor compounds in soybeans Ph.D. Dissertation, Clemson University identifies 21 volatile compounds in stored soybeans with gas chromatography-mass spectrometer analysis (GC-MS). Some compounds were not identified due to the inavailability of reference compounds or limitations in the sensitivity of the GC-MS. Predominant compounds isolated included: acetic acid, 1-hydroxy-2-propanone, butyrolactone, 1,3-dihydroxy-2-propanone, 2,6-dimethoxyphenol, 4-methylphenol, 3-hydroxy-4-methylacetophenone, palmitic acid, and stearic acid.

The undesirable flavor associated with soybeans and soy products has prompted research to develop methods to improve soy flavor. Past studies have focused on 3 main ideas: (1) Inhibition or inactivation of the lipoxygenase enzyme, (2) Removal of flavor compounds and precursors of flavor compounds, and (3) Masking the unwanted flavor (MacLeod & Ames, supra).

One area where soy protein has gained wide acceptance, despite its flavor, is in the production of infant formula. Formula such as Isomil®, produced by the Ross Products Division of Abbott Laboratories, utilizes soy for the sole source of protein. Research has focused upon the removal of certain substances from the soy protein prior to its utilization in infant formula. These substances include nucleic acids, phytic acid (phytate), phytoestrogens, and the volatile substance described above. A commercially viable process for removing all of these substances has not been developed to date. Thus research efforts continue in the field Phytic acid is inositol hexaphosphoric acid, and is part of a large class of compounds that influence the functional and nutritional properties of foods. The phytic acid content of soybeans is reported to be between 1.0 and 1.47% of the dry weight. This is about 60% of the total phosphorus in the soybean. The amount of phytic acid in soy flour has been reported to be as high as 2.24% (w/w). Phytate forms complexes with proteins and with mono- and divalent cations. Therefore, phytate in food components may cause the proteins and minerals to have limited bioavailability. Since phytate is associated with the proteins, protein products also have high levels of phytate.

Phytase is an enzyme that hydrolyzes phytic acid to myo-inisitol and inorganic phosphate. Phytases are special kinds of acid phosphatases that hydrolyze phosphate from phytic acid as well as other phosphorylated substrates. This enzyme is present in plants including seed and germinating beans. The use of phytase in soybeans is limited (Stutardi, Buckle, K. A. (1986) The characterisitic of soybean phytase, *Journal of Food Biochemistry*, (10: 197–216)).

Anno, T., Nakanishi, K., Matsuno, R., Kamikubo, T. (1985) Enzymatic elimination of phytate in soybean milk, Nippon Shokuhin Kogyo Gakkaishi, 32(3): 174–180, hydrolyzed phytate from soybean milk with free wheat phytase and immobilized phytase.

The phytic acid content in the soybean milk was from 0.52 to 1.11 mg/g. The optimum temperature of the phytase enzyme was from 45 to 50° C. The optimum pH of the enzyme was 5.0 to 5.7. The enzyme was stable from pH 3.5 to 7.0. At pH lower than 6.0 the soybean proteins precipitated out. Phytate and protein interacted and formed stronger complexes at acidic pH. This interaction was found to decrease the solubility of the proteins, and influence the hydration, emulsifying properties and dispersibility.

Nucleic acids are another substance that would be desirable to remove from soy protein. Infant formula incorporating soy protein produced via current commercial processes has significantly higher levels of nucleic acids than human breast milk. Defatted soybeans reportedly contain 1.66% ribonucleic acid. Nucleotides contain a nitrogenous base (pyrimidine or purine), a pentose and a phosphate. A nucleoside is a nitrogenous base and a pentose without a phosphate (Lehnigher, A. L., Nelson, D. L., Cox, M. M. (1993) *Principles of Biochemistry*. New York: Worth Publishers)

Phytoestrogens occur in a variety of plants including soybeans. Phytoestrogens are defined as plant substances that are structurally and functionally similar to the gonadol steroid, 17 B-estradiol, that produce estrogenic effects. The desirability of phytoestrogens depends upon the age and sex of the individual who is consuming the soy protein. Phytoestrogens are highly desirable in menopausal and peri-menopausal females. The phytoestrogen mimics the estrogen which the female is either no longer producing or is producing in much smaller amounts.

By contrast, since phytoestrogens are not found in human breast milk it would be desirable to minimize their levels in infant formula. A detailed review of the effects of phytoestrogens on mammals is reported by Kaldas and Hughes in *Reproductive and General Metabolic Effects of Phy-* toestrogens in Mammals, *Reproductive Toxicology*, Vol. 3, pages 81–89 (1989).

As used herein, the terms "phytoestrogens" and "isoflavones" should be considered interchangable. The term "isoflavones" refers to the compounds having the following general formula, with specific compounds identified in Table 1.

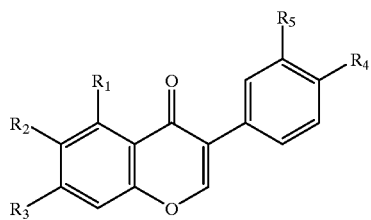

TABLE 1

Chemical structures of isoflavones found in soybeans

| Isoflavone | $R_1$ | $R_2$ | $R_3$ | $R_4$ | $R_5$ |
|---|---|---|---|---|---|
| Daidzein | H | H | OH | OH | H |
| Genistein | OH | H | OH | OH | H |
| Glycitein | H | $OCH_3$ | OH | OH | H |
| Daidzin | H | H | O-glucoside | OH | H |
| Genistin | OH | H | O-glucoside | OH | H |
| Glycitin | H | $OCH_3$ | O-glucoside | OH | H |

As described in Table 2, daidzin, genistin and glycitin are the beta-glucoside conjugate (glucones) moieties. Daidzein, genistein and glycitein are the unconjugated (aglucones) moieties. As used herein "daidzein, genistein and glycitein levels" include both the conjugated and unconjugated moieties. The typical ratio of genistein to daidzein to glycitein in soy protein is 67 to 30 to 3.

Soy proteins are typically in one of three forms when consumed by humans. These include flour (grits), concentrates, and isolates. All three types are made from defatted soybean flakes. Flours and grits contain at least 50% protein and are prepared by milling the flakes. Soy protein concentrates contain at least 70% protein on a dry weight basis. Concentrates are made by repeatedly washing the soy flakes with water, which may optionally contain low levels of food grade alcohols or buffers. The effluent from the repeated washings is discarded and the solid residue is dried, thereby producing the desired concentrate. The yield of concentrates from the starting material is approximately 60–70%.

Soy protein isolates contain a minimum of 90% protein on a dry weight basis. Isolates are made by extracting the soy flour with a dilute alkali (pH <9) and centrifuging. The extract is adjusted to pH 4.5 with a food grade acid such as sulfuric, hydrochloric, phosphoric or acetic acid. At a pH of 4.5, the solubility of the proteins are at a minimum so they will precipitate out. The acid precipitated protein curd is centrifuged, washed, neutralized and spray dried to produce the soy protein isolate. The yield of the isolate is 30% of the original soy flour and 60% of the protein in the flour.

Due to the potential for improving the properties of soy protein, research has been carried out on alternative ways of preparing soy flours, concentrates and isolates. Some of this research has focused upon ultrafiltration. Ultrafiltration is a method used to separate molecules based on molecular size or shape. The membrane acts as a selective barrier. A solution is pumped through a semi-permeable membrane. The membrane retains compounds higher in molecular weight while smaller molecules and water pass through the membrane.

Due to the pressure gradient across the membrane, smaller molecules and water are forced through the membrane. This is referred to as the permeate. Larger molecules (macromolecules) remain in the membrane and are circulated through the system. This is referred to as the retentate. Ultrafiltration retains particles in the range of 0.10 mm to 10 mm (Cheryan, M. (1986) *Ultrafiltration Handbook.* Lancaster, Pa.: Technomic Publishing Co., Inc.).

The first studies applying membrane filtration systems to soy protein separation began in the early to mid 1970s. Membrane filtration processing of soy products seemed promising due to the ability to separate the large protein fractions from the smaller unwanted phytate and oligosaccharide molecules (Omasaiye, O., Cheryan, M., Matthews (1979b) Ultrafiltration of soybean water extracts: Processing characteristics and yields. *Journal of Food Science.* 44: 1027–1031).

Okubo, K., Waldrop, A. B., Lacobucci, G. A., Myers, D. V. (1975) Preparation of low-phytate soybean protein isolate and concentrate by ultrafiltration, *Cereal Chemistry*, 52: 263–271, produced a low-phytate soybean protein isolate using an ultrafiltration method. The first step was to remove the phytate from the soybean with an extraction procedure and dialysis. The next step was continuous diafiltration. Three different methods were used to prepare the isolates for diafiltration. The first was maintained at pH 8.5 at 65° C. with EDTA added. The temperature and pH of the second sample were maintained in the range of the optimum temperature for plant phytases (pH 5.5 and 55° C.). The third sample was maintained at pH 3 and 25° C. with added calcium. Phytate removal occurred at pH 5.5 and 55° C. and at pH 3 with calcium. The authors report the most effective removal of phytate in the soy protein isolate occurred at a pH of 3.0 with added calcium.

Okubu's process did not use ultrafiltration to remove the phytate and suffered from the disadvantage of subjecting the soy to an acidification step. Acidification results in denaturation of the protein which decreases the functionality of the soy. The capability of the denatured soy to serve as an emulsifier is decreased. Proteins typically serve as an emulsifier in enteral formula. They assist in stabilizing the emulsion.

Omasaiye, O., Cheryan, M., Matthew, E., (1978) Removal of oligosaccharides from soybean water extracts by ultrafiltration, *Journal of Food Science*, 43: 354–360, made a full-fat soy protein concentrate by ultrafiltration. Defatted soy flour was the typical starting material for soy protein concentration processing. In this study, soybeans were the starting material. Soybean water extracts were fed into the ultrafiltration system for continuous diafiltration. The composition of the diafiltered product was 58.26% protein, 33.56% fat, 0.77% oligosaccharides, 3.43% ash and 3.98% other compounds.

Omosaiye and Cheryan (1979b), supra, reported on the characteristics of soybean components such as protein, fat and ash during ultrafiltration. Water extracts of whole soybeans were produced by a process using the following steps: Soaking, blanching, grinding, filtration, and rinsing. The filtrate was used as the feed for the ultrafiltration system. A 50,000 molecular weight cut-off membrane was used and essentially no protein or fat was found in the permeate. Ash increased in the retentate as concentration increased, indicating some mineral binding to proteins since minerals should have been freely permeable to the membrane. The final product is this study contained 59.7% protein, 34.2% fat, 2.85% ash, 0.64% oligosaccharides and 0.065% phytic acid.

In an additional study, Omosaiye, O., Cheryan, M., (1979a) Low-phytate, full-fat soy protein product by ultrafiltration of aqueous extracts of whole soybeans, *Cereal Chemistry*, 56(2): 58–62, used a two step process which included ultrafiltration to produce a soy protein isolate low in phytic acid. The first step consisted of extracting the beans. This extract was the subjected to ultrafiltration. The phytate removal depended on the pH of the ultrafiltration solution. The greatest phytate removal occurred at pH 6.7. Less phytate was removed at pH 2.0, pH 8.0 and pH 10.0. These results may in part be explained by phytate-protein interactions. At pH 6.7, the phytate appeared to be water soluble, did not have a strong electrostatic attraction and the salt linkages were weak. The optimum pH for phytate removal was found to be the same as the pH for protein water extracts.

Nicholas, D. J., Cheryan, M. (1981) Production of soy isolates by ultrafiltration: Factors affecting yield and composition, *Journal of Food Science*, 46: 367–372, studied the factors affecting the yield and composition of soy protein isolates during an ultrafiltration process. The starting material was an extract of defatted soy flour. The molecular weight cut-off of the membrance was 50,000. In order for the ultrafiltration step to produce a product with a protein content of 90%, over 80% of the non-protein solutes needed to be removed. The starting material had a protein content of 65%. The highest protein content obtained was 84% on a dry weight basis. Therefore, the ultrafiltration step did not fractionate the compounds to the degree necessary to produce a soy protein isolate. Pumping problems and severe membrance fouling were sited as problems. As observed in other studies (Omosaiye and Cheryan, (1979b), supra) the mineral content did not decrease according to predicted permeability of the membrane, perhaps due to mineral-protein binding. The highest protein yield obtained was 86%.

In summary, the prior art shows that attempts have been made to: 1) produce soy protein isolates and concentrates utilizing ultrafiltration, and; 2) to remove phytate and volatiles from soy proteins. Such attempts have met with limited success. Several authors report severe fouling of the filtration membranes. Fouling is the build up of substances on the surface of the membrane. This prevents the membrane from performing its function of separating molecules on the basis of size. The presence of complex polysaccharides of large molecular weight has often been cited as the source of the fouling. The complex interaction between phytate and protein has been a further source of difficulty. Authors have reported using acid treatments prior to ultrafiltration to disrupt this interaction. The acidification however leads to a partial denaturation of the protein with corresponding adverse effects on its performance.

Thus a need exists in the art for a ultrafiltration process that can be used to produce soy protein on a commercial scale. A further need exist in the art for soy protein having reduced levels of phytoestrogens, phytate, and nucleic acids. A further need exists for a process for producing soy proteins isolates and concentrates that does not subject to the soy proteins to acidic conditions, since such conditions produce a partial denaturization of the protein.

SUMMARY OF THE INVENTION

In accordance with the present invention, a new process for isolating soy proteins has been developed. The new process comprises initially contacting the soy protein source with one or more enzymes containing nuclease and phytase activity for a sufficient period of time to allow the occurrence of an enzymatic treatment. After the enzymatic treatment, the soy protein source is subjected to an ultrafiltration. Following ultrafiltration, the partially isolated soy protein is diluted and subjected to a second ultrafiltration (diafiltration).

In its more preferred embodiments, the process is directed to the production of soy protein concentrates and isolates. Typically a soy flour will be contacted with commercial grade enzymes (pectinases) under conditions suitable for an enzymatic reaction. The product of the enzymatic reaction will be pumped directly under pressure into a tubular housing unit which contains one or more metalic oxide ultrafiltration membranes. Typically these ultrafiltration membranes are secured along the inside surfaces of the housing unit. After the ultrafiltration is completed, the resulting retentate is diluted with an aqueous solution and subjected to a diafiltration in the same ultrafiltration unit. The aqueous solution may be added continually or in a batchwise manner.

The process produces a soy protein having numerous advantages over the soy proteins of the prior art. The soy protein has reduced levels of phytate, isoflavone, and nucleic acids. Levels of phytate in the soy protein produced via the invention are typically reduced by a factor of at least 50%, and more preferably at least 70% and even up to 90–99% (on a weight/weight basis), when compared with soy proteins produced using standard techniques. Typically, the soy proteins will contain no more than about 5 mg of phytate per gram of protein and more preferably no more than about 2 mg of phytate per gram of protein.

Levels of isoflavone in the soy protein produced via the invention are also reduced when compared with currently available soy proteins. Isoflavone levels are typically reduced by a factor of at least 50% and more preferably about 70% (on a weight/weight basis). Absolute levels can vary depending upon the content of isoflavone in the soy beans which varies due to a number of factors such as seasonal variation, growing conditions, source of seed, etc.

Levels of nucleic acid in the soy protein are also reduced. This amount can vary, but typically nucleotide levels will be reduced by a factor of at least 30% (by weight) and more preferably about 50%. The absolute amount of nucleic acid can vary, but typically, the soy protein will contain no more than about 1 mg of ribonucleic acid per gram of protein and more preferably no more than about 0.4 mg of ribonucleic acid. Further the flavor of the soy protein is enhanced. This is due to the removal of the volatile components in soy associated with undesirable flavours.

In addition to having reduced levels of phytate, isoflavone, and nucleic acids; the soy protein has superior emulsifying capacities. Soy protein produced via prior art methods are exposed to acidic washes. The acidic treatment has a tendency to denature the protein and reduce its capability to serve as an emulsifier in infant formula. The soy protein of this invention has a water hydration capacity of about 2 to about 5 and more preferably about 2.6% which is not different from soy flour (see Quinn, J. R. and Paton, D. 1979, A practical measurement of water hydration capacity of protein materials. *Cereal Chem.* 56: 38–40 for methodology). Surface hydrophobicity of soy protein produced via the invention is typically no greater than about 30, is more typically in the range of about 15–25 and more preferably about 20 (see Hayakawa, S. and Nagai, S. 1985, Relationships of hydrophobicity and net charge to the solubility of milk and soy proteins. Journal of Food Science 50: 486–491 for methdology). Nitrogen solubility of the soy protein produced via this invention, when measured at a pH of 7.0 is typically no less than about 40 w/w%, more typically ranges from about 50–70 w/w% and more preferably is no less than about 57 w/w% (see Bera, M. B. and Mukherjee, R. K. 1989, Solubility, emulsifying and foam properties for rice bran protein concentrates. *Journal of Food Science* 50: 142–145 for methodology). Soy protein produced via the methodology of this invention will have an emulsifying capacity of no greater than about 7 meters square per gram ($m^2/g$), more typically about 4–7 $m^2/g$ and most preferably about 6.0 $m^2/g$ (see Pearce, K. N. and Kinsella, J. E. 1978. Emulsifying properties of proteins; Evaluation of a turbidimetric technique *Journal of Agricultural Food Chem.* 26: 716–723 for a description of the methodology) which is not significantly different from that of soy flour and commercial isolate. The stability of the emulsion formed is also important in determining the emulsifying properties. Soy protein produced via this invention has an emulsion stability index of greater than 30 $m^2/g$, more typically from 30–50 $m^2/g$ and more preferably about 40 $m^2/g$.

DETAILED DESCRIPTION

Figure 1:
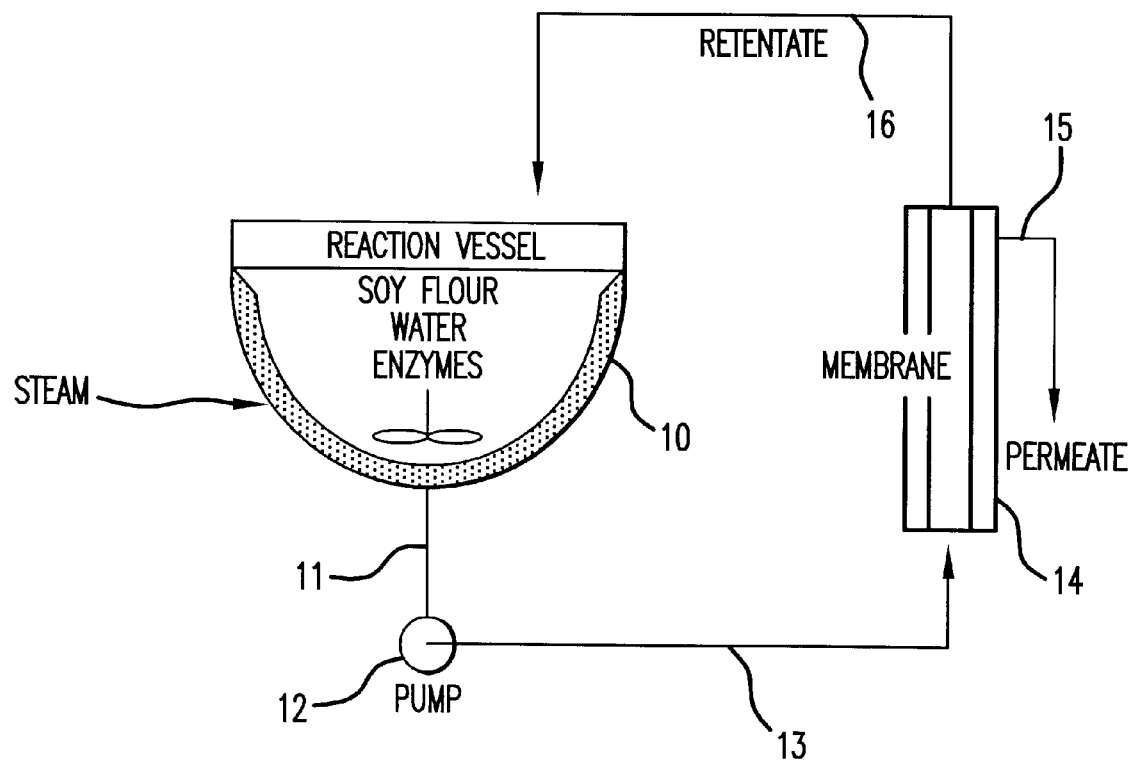
FIG. 1 is a schematic diagram of the ultrafiltration membrane system showing the flow and separation of permeate and retentate streams.

As used in this application;

a) "soy protein concentrate" refers to a composition which contains at least 70% soy protein as measured on a dry weight basis using the Microkjeldahl method for determining nitrogen (AOAC. 1975. *Official Methods of Analysis*, Section 47.021 Association of Official Analytical Chemists, Washington DC). The protein content was calculated using the conversion factor of 6.25.

b) "soy protein isolate" refers to a composition which contains at least 90% soy protein as measured on a dry weight basis using the Microkjeldahl method for determining nitrogen (AOAC. 1975. *Official Methods of Analysis*, Section 47.021 Association of Official Analytical Chemists, Washington DC). The protein content was calculated using the conversion factor of 6.25.

c) "ultrafiltration" refers to a process in which the source of soy material is pumped under pressure against a metallic oxide membrane and in which molecules having a molecular weight of less than 6500 daltons will pass thru the membrane into the filtrate and molecules having a molecular weight of 6500 daltons or greater will be retained by the membrane in the retentate.

d) "diafiltration" refers to a process in which the retentate from the ultrafiltration is rediluted with an aqueous solution and the admixture is brought into contact with the ultrafiltration membrane and subjected to a second ultrafiltration.

e) "nucleic acids" refers to total phosphorus nucleotides (TPANT), total free nucleic acids and ribonucleic acids. "Levels of nucleic acids" refers to a determination carried out as described in *American Journal of Clinical Nutrition*; 61(6): 1224–1230, 1995.

f) "isoflavones" refers to daidzein, genistein and glycitein. "Levels of isoflavones" refers a determination by the method of Wang and Murphy, *Journal of Agricultural Food Chem.* 42: 1666–1673 (1994).

g) "phytate" refers to phytic acid. "Phytate levels" refers to a determination by the method of McChance and Widdlewson, *The Biochemical Journal*, 29:2694 (1935) and Fiske, and Subbarrow, *Journal of Biochemistry*, 66:375 (1925).

As noted above, the present invention is directed to a multistep process for isolating and purifying soy proteins. The soy protein is isolated from the soybean. The soybean is an excellent source of high quality protein, where about 38% to 40% of the soybean is protein. Briefly (as shown in Scheme I), the processing of soybeans involves the extraction of the oil from the dehulled, and cracked soybeans leaving the defatted soybean flakes.

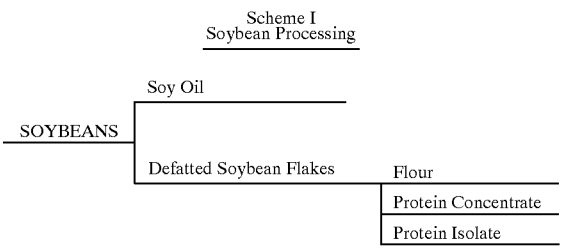

Scheme I
Soybean Processing

The defatted soybean flakes are typically milled into flours. As described above, they may be further processed into protein concentrates or isolates. One aspect of this invention is directed to methods for the production of these concentrates and isolates.

Typically defatted soy bean flakes or soy flours will be the source of soy protein in the inventive process. However soy concentrate may be utilized as well.

The initial step of the process is an enzymatic treatment in which the soy protein source is contacted with an appropriate enzyme preparation containing both phytase and nuclease activity. The enzyme, or enzymes, used in the process must provide both nuclease activity and phytase activity. It is preferable to use a single enzyme possessing both activities. A process using a single enzyme possess the advantages of saving on processing time and reducing two constituents like phytate and nucleic acids in the same enzymatic treatment. A single enzyme also reduces the potential of introducing allergens into the product.

The level of phytase activity contained within the enzyme can vary widely. Typically the enzyme will contain at least 56 units phytase activity per milliter of enzyme and more preferably from about 220 phytase activity units per milliter of enzyme to about 730 phytase activity units per milliter. The level of nuclease activity may vary because nuclease are ubiquitous. The commercial enzymes, crystalzyme and pectinase used in this invention possess nuclease activity.

One example of an enzyme possessing such dual activities includes commercial grade pectinases. Examples include pectinase from Sigma, Crystalzyme from Valley Research, Enzeco Pectinase CO or PL from Enzyme Dev. Co., Clarex L or ML from Genecor or Peelzyme from Novo Nordisk.

Alternatively, single enzymes possessing nuclease or phytase activity can be used. Sources of phytase activity include microorganisms like bacteria and fungi. Sources of nuclease activity also include bacteria and fungi.

The enzymatic treatment is carried out using techniques well known to those skilled in the art. The reactants are assembled together in an appropriate mixing vessel. Any vessel suitable for enzymatic reactions may be utilized. In the inventions most preferred embodiment, the reactants are admixed together in a vessel connected directly to the ultrafiltration apparatus so it may be pumped directly into the filtration membranes at the conclusion of the enzymatic reaction.

The soy flour (or other source of soy protein) will be diluted with an aqueous solution in the reaction vessel. Typically only water will be used, but dilute alcohol may also be used. The quantity of soy flour can vary widely. Typically the soy source will be present in the reaction vessel in an amount ranging from about 5% to about 12.5% and more preferably about 10%, based upon weight. The quantity of enzyme can vary, but will typically be present in an amount of at least 0.3% v/v and more preferably about 0.3% to about 0.9% v/v based upon the phytase activity of the enzyme and the quantity of the soy material. The enzyme reaction will be carried out at a temperature of about 84.50° F. to about 1220° F. and more preferably about 98.60° F. to about 107.60° F. The enzymatic reaction will be allowed to continue for a period of time of at least about three hours and optionally longer. At the conclusion of the enzymatic reaction, the solution is pumped directly into the ultrafiltration apparatus.

The next step in the process is the ultrafiltration of the enzyme treated soy flour solution. The ultrafiltration will be carried out using techniques generally known in the art. A detailed discussion of ultrafiltration techniques and apparatuses can be found in the "Ultrafiltration Handbook" by Munir Cheryan, Technomic Publishing Co. Lancaster, Pa. (which is hereby incorporated by reference).

Any of the various ultrafiltration devices that are commercially available may be utilized in the practice of this invention. Examples of suitable ultrafiltration devices include those described in U.S. Pat. No's. 4,716,044; 4,200,533; 5,1130,237; and 4,897,465, the contents of which are hereby incorporated by reference.

Ultrafiltration is typically carried out with modular units. A module will contain numerous tubes through which the relevant fluid will be pumped. The tubes will be impregnated with the ultrafiltration membranes. Molecules having a size (molecular weight) of less than about 6500 daltons will pass thru the membranes as the permeate and will be channeled away. Molecules having a size greater than 6500 daltons will not pass thru the membrane but will be retained by the module as the retentate.

The ultrafiltration membranes impregnating the tubes should be manufactured from metallic oxides. Examples of suitable metallic oxides include titanium dioxide, but the invention is not limited to such materials. In the invention's most preferred embodiment, the membranes will be manufactured from sintered titanium dioxide. One example of a suitable ultrafiltration device is the Scepter 316L which is manufactured by Graver Technologies of Seneca, S.C.

Figure 12:
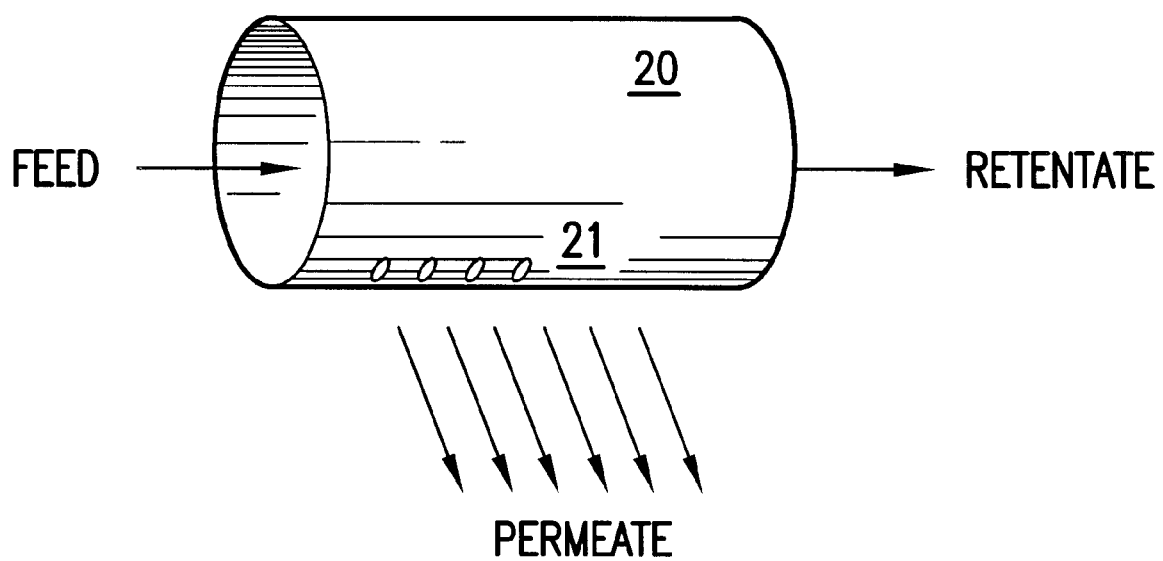
FIG. 12 is a schematic diagram of the metallic oxide ultrafiltration membrane.

FIG. 1 provides an illustration of an exemplary ultrafiltration device according to the present invention. Reaction Vessel 10 is connected to an outflow tube 11 which is connected to a pump 12. Pump 12 is connected to an outflow tube 13 which is connected to ultrafiltration system 14 in which are multiple ultrafiltration membranes as depicted in FIG. 12. Ultrafiltration system 14 is connected to outflow tube 15 from which the permeate from the ultrafiltration system is directed. Ultrafiltration system 14 is also connected to outflow tube 16 by which the retentate is pumped from the ultrafiltration system and returned to reaction vessel 10 for dilution prior to diafiltration. FIG. 12 provides an illustration of ultrafiltration membrane according to the invention. Tube 20 is impregnated with multiple membranes 21.

The process of the invention generally works in the following manner. The enzyme treated soy protein is placed in reaction vessel 10 and is pumped under pressure through output tubes 11 and 13 into ultrafiltration system 14. The enzyme treated soy is isolated and purified inside ultrafiltration system 14. As is depicted in FIG. 12, the undesired constituents such as isoflavones, phytate, volatiles, and nucleic acids flow through membranes 21 as the permeate and are directed away from tube 20. The desired soy proteins are retained in tube 20 as the retentate. The undesired permeate leaves the ultrafiltration device through tube 15. This permeate may be discarded or retained for further processing, such as isolating the isoflavones. The desired retentate will leave the ultrafiltration device through tube 16.

The actual ultrafiltration process is carried out using techniques known to those familiar with ultrafiltration. The permeability of membranes to water is one important variable in how the ultrafiltration is carried out. Permeability serves as an indicator of relative pore size, and thus represents rejection characteristics and rate of permeate flow. A change in water permeability also serves as a reference to indicate when it is time to clean the membranes to return them to their original state.

The process should be carried out so that the ultrafiltration membrane has an initial permeability to water of about 0.55 to about 0.58 gallons/sq. ft./day (gfd). This may be determined by the following formula:

$$P = \text{Permeate flux/Inlet Pressure}$$

in which permeate flux is the number of gallons of water passing through a square foot of membrane area per day and inlet pressure is maintained at a given constant and is measured in pounds/square inch (psi). Throughout the ultrafiltration, the permeability should be maintained within a range of about 0.04 to about 0.3 and more preferably about 0.10 gfd.

The concentration of the soy protein will be adjusted to optimize the ultrafiltration. The soy protein source will be present in the ultrafiltration solution at a concentration of about 5 w/w % to about 20 w/w % and more preferably at a concentration of about 5 w/w % to about 10 w/w % during the ultrafiltration. Typically the ultrafiltration solution will be water, but buffered solutions in the pH range of 6.0 to 7.0 may also be used.

It is important to point out that one of the advantages of the invention is the elevated concentrations at which the ultrafiltration may be carried out. In the prior art processes involving soy protein, it was not possible to exceed a concentration of 6.9 w/w % in the solution being ultrafiltered. However, the enzymatic pretreatment allows the ultrafiltration to be run at concentrations of up to about 20 w/w %. Such a result was entirely unexpected. Such a result also allows the ultrafiltration device to process a greater amount of soy protein in a given period of time.

The pH of the ultrafiltration solution should be maintained in a range of from about 7.0 to about 10.0, more preferably about 8.0 to about 9.0, and most preferably about 8.8 to 9.0. As noted above, an advantage of the invention is that soy protein isolates and concentrates are not subjected to an acidic precipitation step. Thus it is important that the pH of the soy filtrate not be allowed to drop below 5.0, since pH's below that range have a tendency to denature the protein. The pH may be adjusted with sodium hydroxide, potassium hydroxide, sodium carbonate, sodium bicarbonate, potassium carbonate, potassium bicarbonate or other equivalent bases.

The next step in the process is the diafiltration step. This diafiltration may be carried out using techniques well known in the art. In the diafiltration, the soy protein containing retentate produced via the ultrafiltration is rediluted with an aqueous solution and the admixture is brought into contact with the ultrafiltration membrane and subjected to a second ultrafiltration.

This diafiltation will typically be conducted in a batch manner. The soy protein containing retentate will be returned to reaction vessel (10). It will be rediluted with aqueous fluid. The volume of fluid may vary, but will typically be in the range of from about 50 to 120% of the volume used for the ultrafiltration and more preferably from 90 to 100%. For example if 10 liters of solution was used in the original ultrafiltration, then 5 to 12 liters will be used for the diafiltration. The diluted retentate will then be subjected to a second ultrafiltration in the same manner as described above. Alternatively, a recirculating ultrafiltration system may be used in which the retenate is pumped back directly to reaction vessel (10) and pumped back through the system. Detailed descriptions of such continuous diafiltration system may be found in "Ultrafiltration Handbook by Cheyans, supra.

At the conclusion of the diafiltration, the soy protein is typically processed so that it may be incorporated into other food products. The soy protein may be processed in the manner that is most optimal for the food product. Typically however the soy protein will be centrifuged, heat treated to reduce the chance for microbial contamination and dried.

The soy protein produced by the process above differs from that produced in the prior art. It has reduced levels of phytate. For example, soy flour (the typical starting material in the inventive process), contains 21–22 mg of phytate per gram of soy protein. Soy protein produced according to the invention will contain no more than about 5 mg of phytate and more preferably no more than about 1.6 to 1.7 mg of phytate. Soy flour typically contains about 7 to 8 gram of ribonucleic acids per kilogram of soy flour. Soy protein produced via the instant invention will contain no more than about 0.3 to about 0.4 grams of ribonucleic acids per kilogram of soy protein.

The soy proteins of this invention also have enhanced solubility compared with those of the prior art. Soy protein that is precipitated from soy flour via acidic conditions (ie. a pH of less than 4.5) has a nitrogen solubility of 17 w/w % in water at room temperature. The soy proteins of this invention, typically have a solubility of at least 40 w/w % in water, at room temperature, at a pH of 7.0 and more typically about 55 w/w % under comparable conditions.

Soy protein that is precitated from soy flour via acidic conditions (i.e., a pH of less that 4.5) has a surface hydrophobicity of 36.77 as determined by Hayakawa et al., supra. The soy proteins of this invention will have a hydrophobicity of no more than about 30 and more typically about 20.

The soy protein produced via the instant invention has superior emulsifying capacities. Soy protein that is precipitated from soy flour via acidic conditions (ie. a pH of less than 4.5) has an emulsifying activity index of about 8.2 $m^2$/gram and a stability index of about $27m^2$/gram. The soy protein produced according to this invention will have an emulsifying activity index of no greater than about $6m^2$/gram and a stability index of about 40 $m^2$/gram.

The soy protein produced via this isolation process may be processed into food products and nutritional compositions as is typically known in the art. Due to the soy proteins superior emulsifying properties, it may be utilized in the production of enteral formula and especially medical foods. Since the soy protein has reduced levels of nucleic acids, phytate and isoflavones as well as enhanced emulsifying capacities, it will be especially suited for use in the production of infant formula.

An enteral formula of the present invention contains edible macronutrients, vitamins and minerals in amounts desired for a particular use. The amounts of such ingredients will vary depending on whether the formulation is intended for use with normal, healthy infants, children, or adults or subjects having specialized needs such as accompany certain pathological conditions (e.g., metabolic disorders). It will be understood by persons skilled in the art that the components utilized in an enteral formula of the present invention are of semi-purified or purified origin. By semi-purified or purified is meant a material which has been prepared by purification of a natural material or by synthesis. These techniques are well known in the art (See, e.g., Code of Federal Regulations for Food Ingredients and Food Processing; Recommended Dietary Allowances, 10th Ed., National Academy Press, Washington D.C., 1989).

In a preferred embodiment, a nutritional formulation is provided that is suitable for feeding infants. The formula comprises, in addition to the soy protein, macronutrients, vitamins and minerals in amounts designed to provide the daily nutritional requirements of infants. The macronutritional components include edible fats, carbohydrates and proteins. Exemplary edible fats are coconut oil, soy oil, sources of long chain polyunsaturated fatty acids, and mono- and diglycerides. Exemplary carbohydrates are glucose, edible lactose and hydrolyzed cornstarch. Typically, soy protein will be utilized in these formula, but if desired other protein sources such as whey or casein may be blended with the soy. These macronutrients would be added in the form of commonly accepted nutritional compounds in amounts equivalent to those present in human milk on an energy basis, i.e., on a per calorie basis.

The infant formula would preferably include the following vitamins and minerals: calcium, phosphorous, potassium, sodium, chloride, magnesium, manganese, iron, copper, zinc, selenium, iodine, and Vitamins A, E, D, C, and the B complex. Further nutritional guidelines for infant formula can be found in the Infant Formula Act, 21 USC section 350*a*.

A more detailed description of infant formula and its preparation may be found in U.S. Pat. No. 5,021,045 which is hereby incorporated by reference. A typical infant formula will have the following composition 1) protein, said protein being of a concentration of between 10 and 25 grams per liter of formula; 2) fat, said fat being of a concentration of between 20 and 45 grams per liter; and 3) carbohydrates, said carbohydrates being of a concentration of between 60 and 110 grams per liter of formula. Preferably, the protein has as its source soy protein isolate alone, but sodium and calcium caseinates or a blend thereof may be incorporated if desired; said fat has as its source soy, coconut or corn oil, or another vegetable oil or a blend thereof; and said carbohydrates have as their source, sucrose, corn syrup, glucose polymers, or other carbohydrates, or a blend thereof.

The infant formula of this invention are preferably prepared using the following method. An appropriate quantity of protein is dispersed in sufficient water to solubilize it, thereby forming a protein solution. Typically this protein source would be soy protein isolate. A carbohydrate source such as one or more of corn syrup solids, maltodextrins, and sucrose is dissolved in water, thereby forming a carbohydrate solution. Appropriate minerals are dissolved in water, so as to form a mineral solution.

Once formed the solutions (protein, carbohydrate, and mineral) are combined in appropriate quantities with vegetable oils and oil soluble vitamins. The resulting solution is then heat processed and homogenized. Following processing, water soluble vitamins are added. The solution is then diluted with water to the appropriate caloric density, approximately 670–725 kcal per liter of formula for infants. The formula is then dispensed into containers and retorted to obtain commercial sterility. As prepared, the formula contains appropriate nutrients in compliance with the Infant Formula Act as of the date of this application. It should also be recognized that the unique formula of this invention could be prepared for use in powdered form or as a concentrated liquid. The powder can be prepared by spray drying the infant formula prepared as indicated above, and the formula can be reconstituted by rehydrating the concentrate.

Other advantages and embodiments of the invention will readily become apparent to those skilled in the art, based upon a review of the teachings of this document. The following examples are presented to further illustrate the invention, but they should not be viewed as limiting its disclosure in any manner. Any reference in this application to a numerical range should be construed as encompassing the range specified and any subset hereof. For example a range of 1 to 10 should also be construed as encompassing a range of 2–9, 3–6, 4–7, 8–9, 3–5, etc.

Examples 1

1000 grams of defatted soy flour was diluted in 20 liters of distilled water to give a 5% w/v solution to which 60 milliliters of the enzyme pectinase was added at a ratio of 0.3% v/v. The pectinase was obtained from Sigma Chemical Company of St. Louis, Mo. having a declared activity of 11.8 units/ milligram protein. (One unit will liberate 1.01 $\mu$mole of galacturonic acid per min at pH 4.0 at 25° C.). The enzyme treatment was carried out in a steam jacketed kettle whose temperature was maintained between 37–42° C. for three hours. The solution was then pumped through a membrane system using three porous stainless-steel tubular microfiltration membranes (60 cm×1.57 cm i.d. per membrane). The membranes were supplied by Graver Separations, Inc., Seneca, S.C. The retentate was returned to the steam jacketed kettle and the permeate was collected as shown in FIG. 1. The permeate flux at the start of the microfiltration was 2.88 gallons/sq. ft./day at 950° F. The inlet pressure was 29.5 psi. Ten liters of permeate collected was labeled as the microfiltered permeate at which time the concentration of solids was 2x. The flux at the end of microfiltration was 0.81 gallons/sq.ft./ day at 102.2° F. and the inlet pressure was 40 psi. This was designated as the end of microfiltration. Diafiltration that follows microfiltration does not result in any further concentration of solids. Ten liters of water equal to the volume of microfiltered permeate collected as added back to the kettle and filtration was allowed to continue through the membranes until ten liters of diafiltered permeate was collected. The permeate flux immediately after the addition of ten liters of water (i.e., at the start of diafiltration) was 2.00 gallons/sq.ft./day at 86° F. and the inlet pressure was 34 psi. At the end of diafiltration the permeate flux was 0.96 gallons/sq. ft./day at 105.80° F. and the inlet pressure was 44 psi. The pump was shut off after diafiltration and the retentate was collected for further processing. The pH of the permeate (6.23) was adjusted to pH 9.0 with few drops of 50% sodium hydroxide and stirred continuously to increase protein solubility. The solution was then centrifuged at 2000×g for 20 minutes to remove the insoluble solids. The supernatant was the freeze dried to obtain a flaky powder that was used for further analysis.

Example 2

1000 grams of defatted soy flour was diluted in 20 liters of distilled water to give a 5% w/v solution to which 180 milliliter of the enzyme Crystalzyme 100XL was added at a ratio of 0.9% v/v. The crystalzyme was obtained from Valley Research, Inc., South Bend, IN having a declared activity of 110,000 Apple Juice Depectinising Units (AJDU) units/ gram protein. The enzyme treatment was carried out in a steam jacketed kettle whose temperature was maintained between 37–42° C. for three hours. The solution was then pumped through a membrane system using three porous stainless-steel tubular microfiltration membranes (60 cm×1.57 cm i.d. per membrane). The membranes were supplied by Graver Separations, Inc., Seneca, S.C. The retentate was returned to the steam jacketed kettle and the permeate was collected as shown in FIG. 1. The permeate flux at the start of the microfiltration was 4.32 gallons/sq.ft./ day at 98.6° F. The inlet pressure was 25 psi. Ten liters of permeate collected was labeled as the microfiltered permeate at which time the concentration of solids was 2x. The flux at the end of micro filtration was 0.72 gallons/sq.ft./day at 118.40° C. and the inlet pressure was 30 psi. This was designated as the end of microfiltration. Diafiltration that follows microfiltration does not result in any further concentration of solids. Ten liters of water equal to the volume of microfiltered permeate collected was added back to the kettle and filtration was allowed to continue through the membranes until ten liters of diafiltered permeate was collected. The permeate flux immediately after the addition of 10 liters of water (i.e., at the start of diafiltration) was 2.16 gallons/sq.ft./day at 122° F. and the inlet pressure was 40 psi. At the end of diafiltration the permeate flux was 1.20 gallons/sq.ft./day at 122° F. and the inlet pressure was 30 psi. The pump was shut off after diafiltration and the retentate was collected from the kettle for further processing. The pH of the permeate (6.20) was adjusted to pH 9.0 with few drops of 50% sodium hydroxide and stirred continuously to increase protein solubility. The solution was then centrifuged at 2000×g for 20 minutes to remove the insoluble solids. The supernatant was then freeze dried to obtain a flaky powder that was used for further analysis.

Example 3

500 grams of defatted soy flour was diluted in 10 liters of distilled water to give a 5% w/v solution to which no enzyme was added and this was treated as control. The enzyme treatment was stirred in a steam jacketed kettle whose temperature was maintained between 37–420° C. for three hours. The solution was then pumped through a membrane system using three porous stainless-steel tubular microfiltration membranes (60 cm×1.57 cm i.d. per membrane). The membranes were supplied by Graver Separations, Inc., Seneca, S.C. The retentate was returned to the steam jacketed kettle and the permeate was collected as shown in FIG. 1. The permeate flux at the start of the microfiltration was 3.16 gallons/sq.ft./day at 950° F. The inlet pressure was 14 psi. Five liters of permeate collected was labeled as the microfiltered permeate at which time the concentration of solids was 2×. The flux at the end of microfiltration was 0.93 gallons sq. ft./day at 102.2° F. and the inlet pressure was 20 psi. This was designated as the end of microfiltration. Diafiltration that follows microfiltration does not result in any further concentration of solids. Five liters of water equal to the volume of microfiltered permeate collected was added back to the kettle and filtration was allowed to continue through the membranes until five liters of diafiltered permeate was collected. The permeate flux immediately after the addition of five liters of water (i.e., at the start of diafiltration) was 2.16 gallons/sq.ft./day at 86° F. and the inlet pressure was 35 psi. At the end of diafiltration the permeate flux was 0.77 gallons/sq.ft./day at 105.8° F. and the inlet pressure was 13 psi. The pump was shut off after diafiltration and the retentate was collected for further processing. The pH of the permeate (6.20) was adjusted to pH 9.0 with few drops of 50% sodium hydroxide and stirred continuously to increase protein solubility. The solution was then centrifuged at 2000[m][]g for 20 minutes to remove the insoluble solids. The supernatant was then freeze dried to obtain a flaky powder that was used for further analysis.

Example 4

The freeze dried flaky powder obtained after the ultrafiltration used to concentrate the soy proteins from defatted soy flour was pulverized to a fine powder using a mortar and pestle. The freeze dried retentate from the enzyme treatments and membrane processing, soy flour and permeate collected were analyzed for protein. The protein content was calculated using a conversion factor of 6.25 to convert the nitrogen content estimated by the Microkjeldahl analysis as described in AOAC Section 47.021, 1975 and are presented in Table 1.

TABLE 1

| Sample | Protein Content (%) |
| --- | --- |
| Soy Flour | 51.2 |
| Diafiltered Retentate | 56.2 |
| Pectinase Retentate | 76.7 |
| Crystalzyme Retentate | 78.5 |
| Permeate | <0.5 |

As seen in Table 1 the protein content of the diafiltered retentate was only 56.2% but adjusting the pH to 9.0 resulted in a protein content of 76.7% and 78.5% respectively. This example therefore suggest that increasing the pH is necessary to enhance the solubility and recovery of soy proteins. Also, the permeate contained less that 0.5% suggesting that the nitrogen may be non protein nitrogen released from nucleic acids and that the rejection of the soy bean proteins by the membranes during microfiltration and diafiltered retentate was nearly 100%. From the results of Table 1 it is clear that the soy proteins from soy flour are concentrates based on the definition that a soy protein concentrate should contain at least 70% protein on a dry weight basis.

Example 5

HPLC Gel filtration was used to determine the molecular weight profile of soy flour, permeate and retentate samples. The standard proteins used for molecular weight comparison included apoferritin (MW 443,000), β amylase (MW 200,000), bovine serum albumin (MW 66,000), ovalbumin (MW 43,000) α lactalbumin (MW 14,200) and tryptophan (MW 204). The retention times of the standards are given in Table 2.

TABLE 2

| Standard Protein | Molecular Weight (Daltons) | Retention Time (min) |
| --- | --- | --- |
| Apoferritin | 443,000 | 28.3 |
|  | 200,000 | 29.85 |
| β amylase | 66,000 | 32.36 |
| Bovine serum albumin |  |  |
| Ovalbumin | 43,000 | 33.72 |
|  | 14,200 | 36.69 |
| α Lactalbumin | 204 | 51.02 |
| DL Tryptophan |  |  |

Figure 2A:
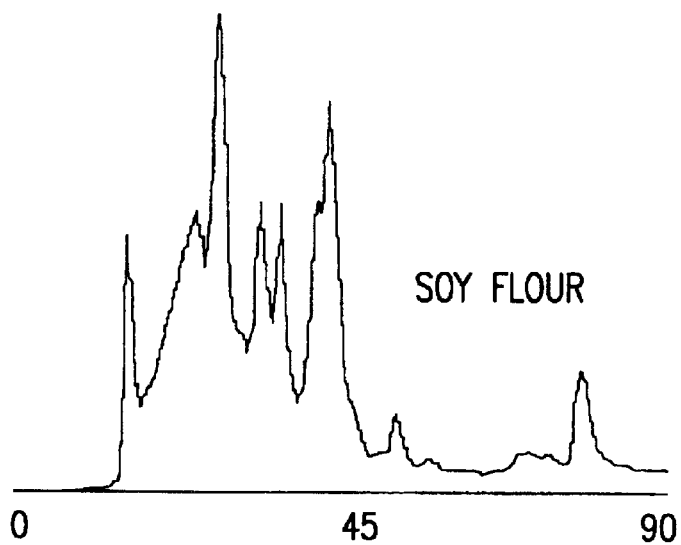
FIG. 2 is a High Performance Liquid Chromatogram—Gel Filtration profile of Soy Flour, Diafiltered Retentate and Permeate.
Figure 2B:
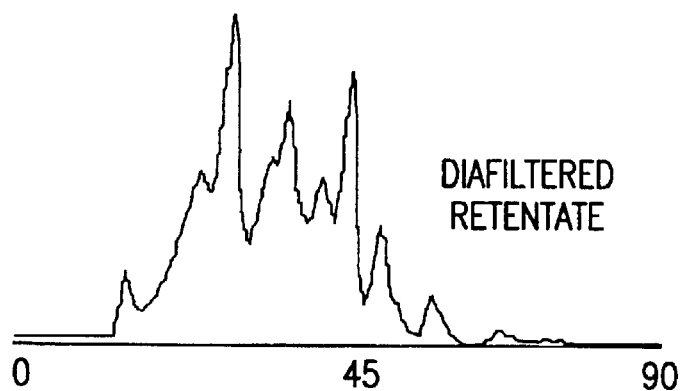
Figure 2C:
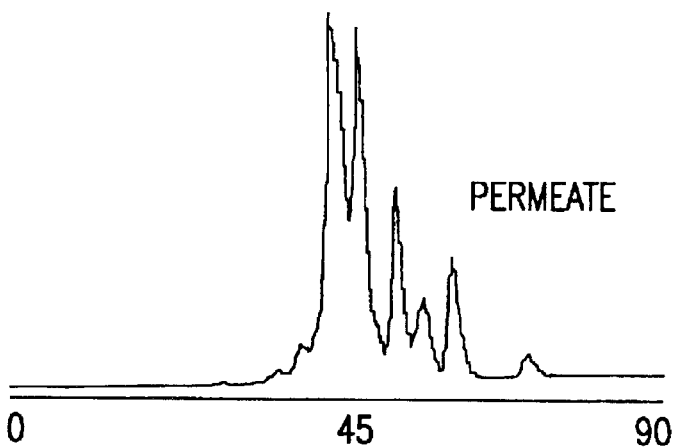

The HPLC profiles of proteins from soy flour, diafiltered retentate and permeate are shown in FIG. 2. The retention times for peaks in the soy flour and retentate were the same but some changes in peak areas were observed. This indicated that the major soy proteins were intact in the retentate. The first peaks in the permeate had a retention time around 40 minutes which corresponds to a molecular weight of 6500 daltons. This means that proteins with molecular weights greater than 6500 were retained by the membrane whereas proteins with molecular weights less than 6500 passed through the membrane into the permeate.

Example 6

The compositional analysis constituting of protein, carbohydrate, ash and moisture soy flour, commercial soy protein isolate and the two enzyme treated membrane soy ncentrates (MSC) was determined and the results presented in Table 2.

TABLE 2

| Sample | % Protein | % Carbohydrate | % Ash | % Moisture |
| --- | --- | --- | --- | --- |
| Soy Flour | 51.2 | 15.2 | 6.2 | 7.2 |
| Supro 1610 | 86.7 | 1.7 | 4.3 | 5.2 |
| MSC (Sigma) | 76.7 | 8.9 | 5.3 | 5.4 |
| MSC (Crystalzyme) | 78.5 | 5.7 | 4.9 | 6.9 |

The results of this example suggest that processing with enzymes and microfiltration/diafiltration can produce a concentrated soy protein product approaching the identity of current soy protein isolates without using acid precipitation.

Example 7

Figure 3A:
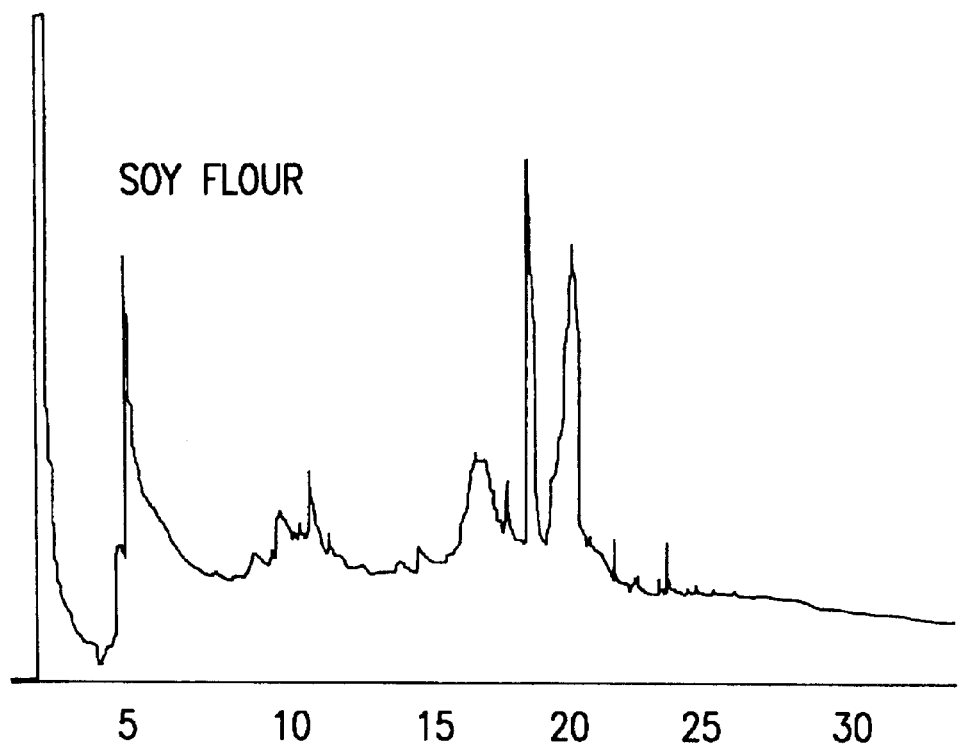
FIG. 3 is a Gas Chromatogram (GC) of Soy Flour and Permeate.
Figure 3B:
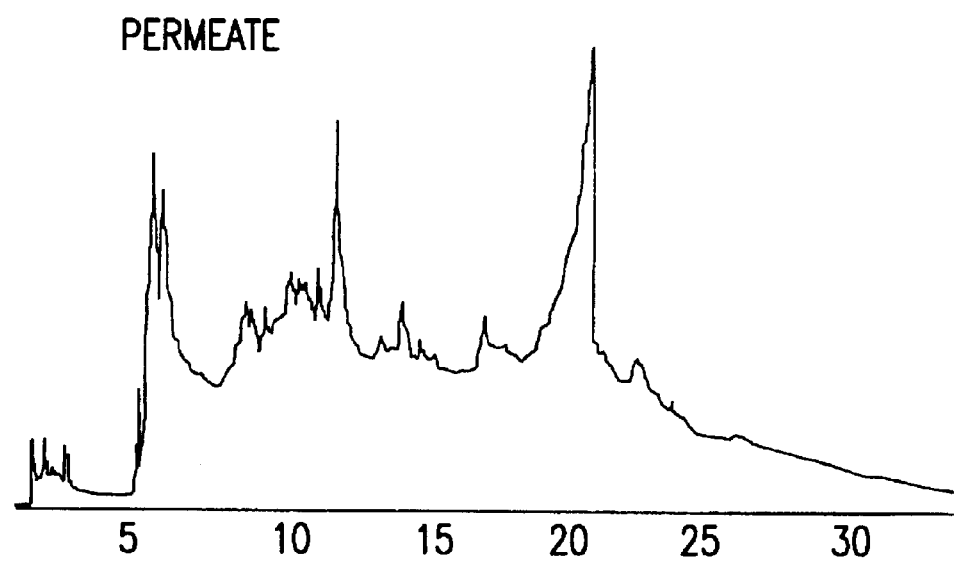
Figure 4A:
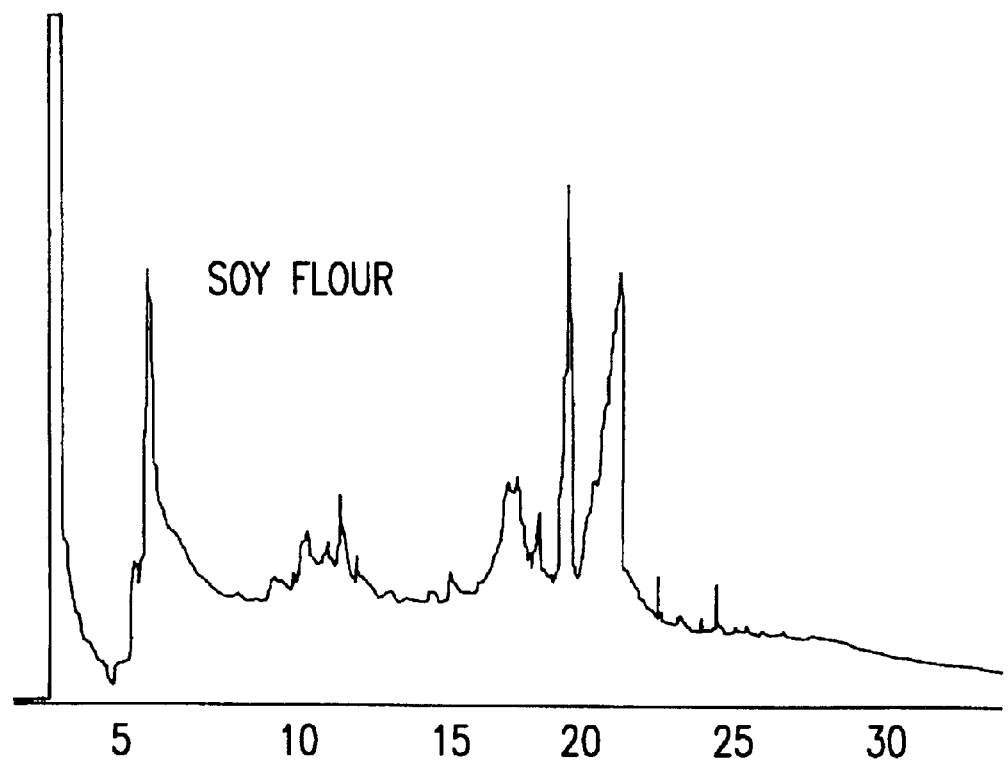
FIG. 4 is a GC of Soy Flour and Diafiltered Retentate.
Figure 4B:
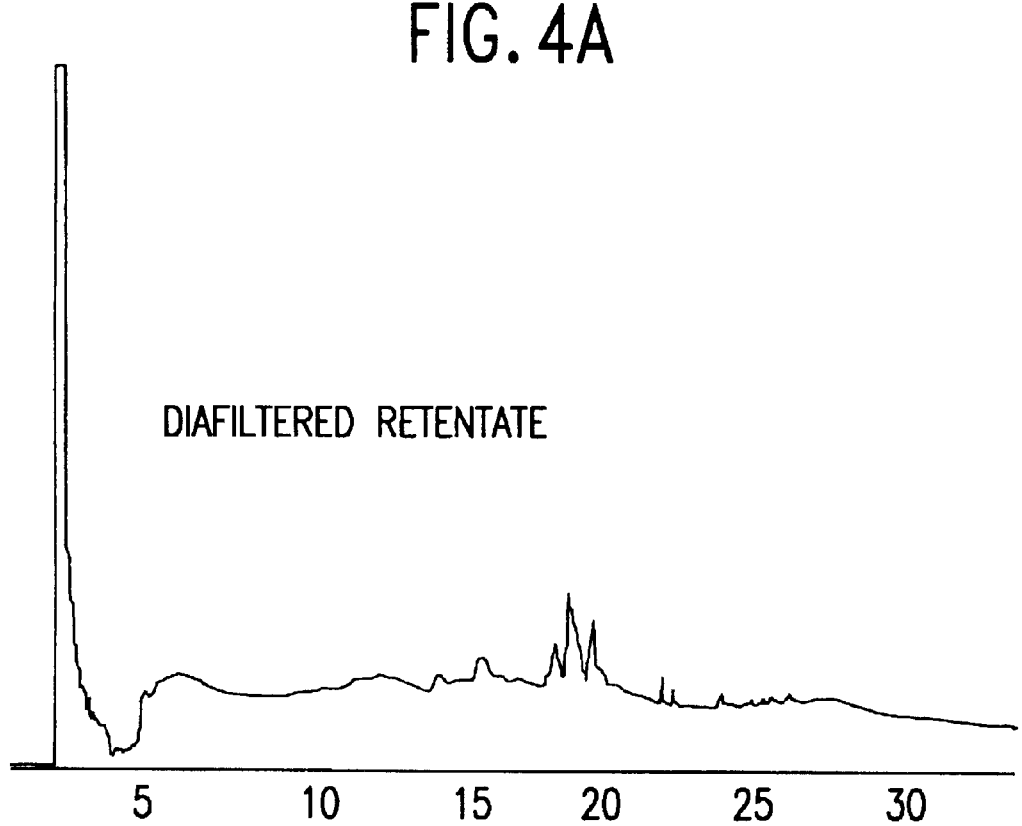
Figure 5A:
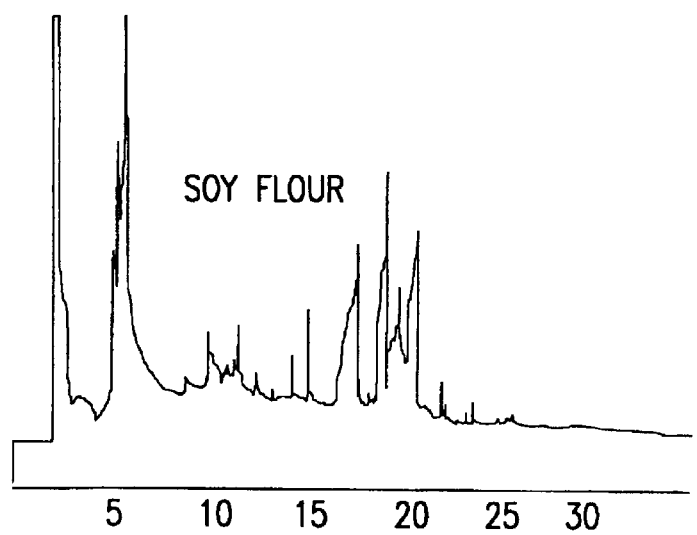
FIG. 5 is a GC of Soy Flour, Filtered Retentate and Diafiltered Retentate.
Figure 5B:
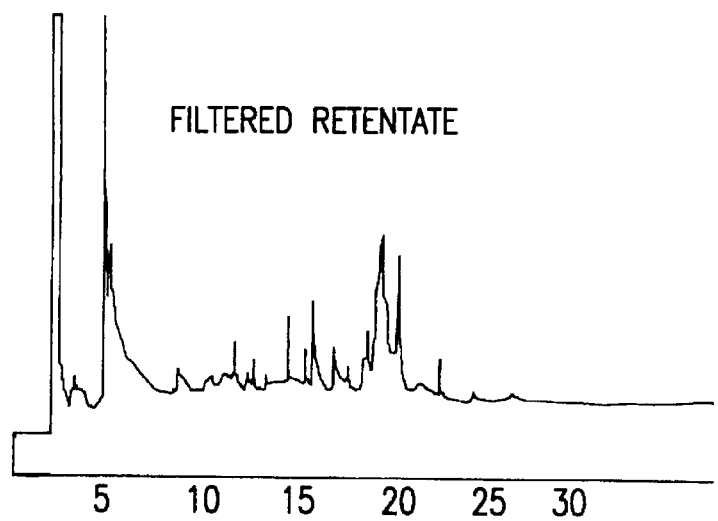
Figure 5C:
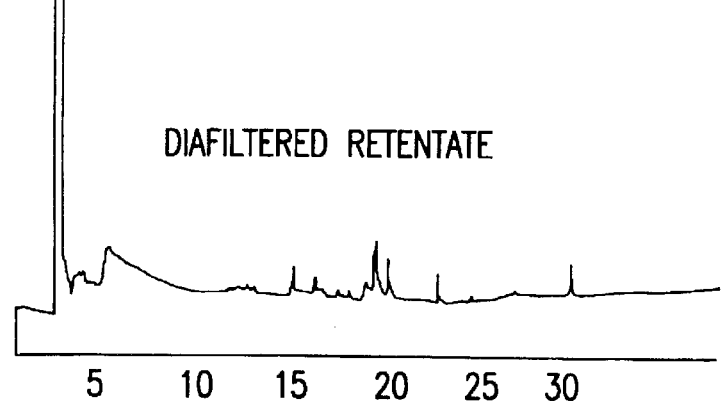
Figure 6A:
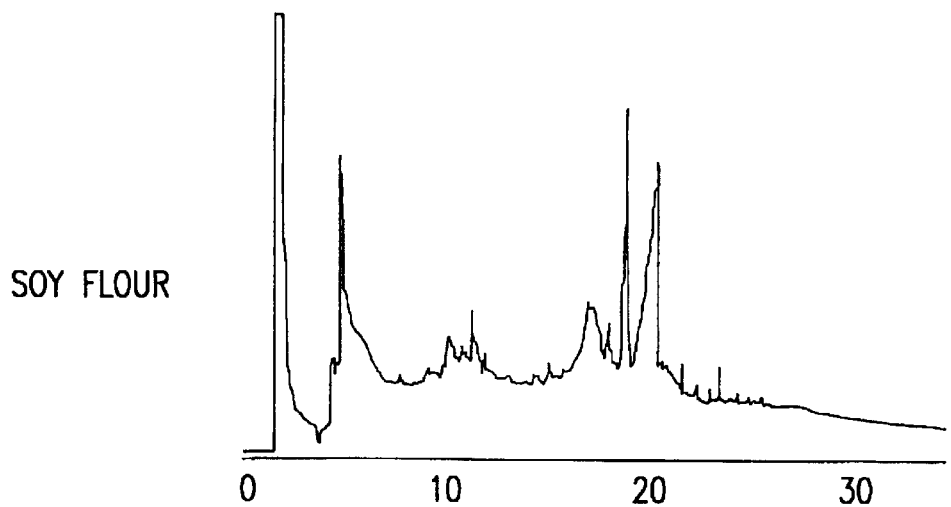
FIG. 6 is a GC of Soy Flour, Diafiltered Retentate and Permeate.
Figure 6B:
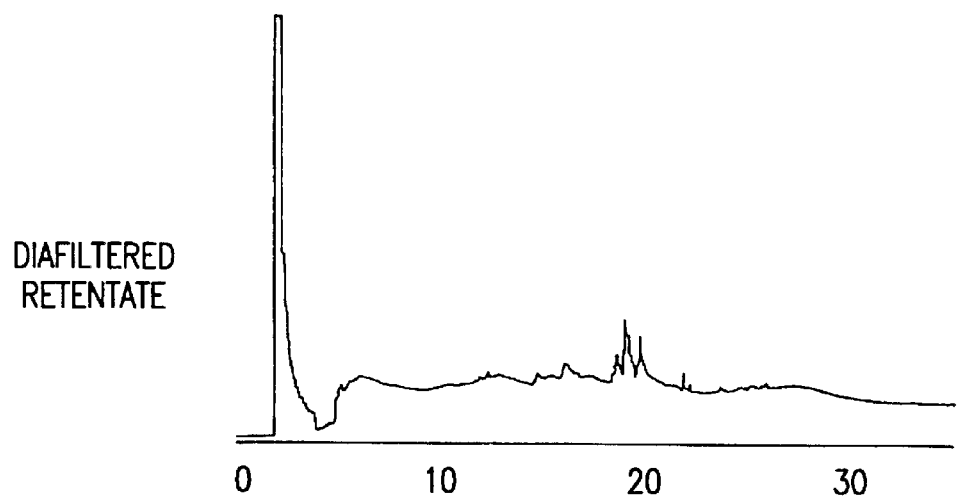
Figure 6C:
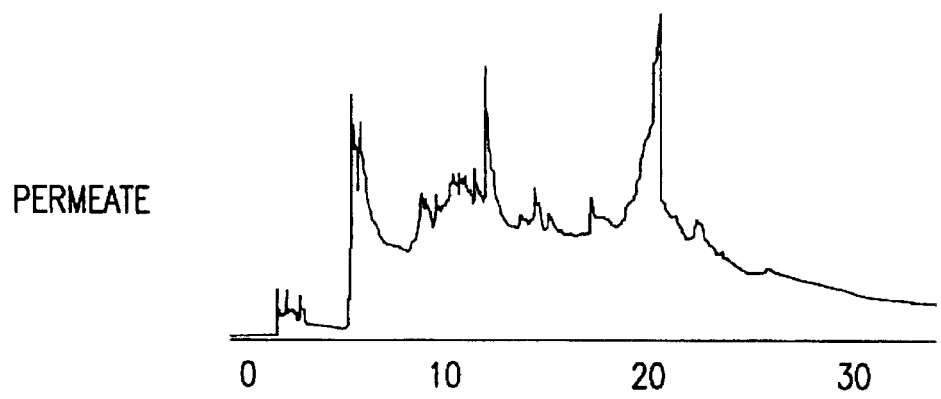

Several compounds have been identified to contribute to soy flavor and odor that ave been characterized as green, grassy, bitter and beany. The typical flavor of soy has herefore been a critical factor and has limited its extensive use in the United States and Europe. The volatile compounds from soy flour, microfiltered retentate and diafiltered retentate was extracted in 50% methanol and subjected to gas chromatographic analysis. The permeate samples did not need extraction prior to gas chromatography. FIG. 3 shows that the soy flour and permeate had similar profiles with major peaks around 6, 10, and 21 minutes. FIG. 4 shows that the diafiltered retentate had smaller peaks and reduced area under the peaks, as compared to soy flour, representing a reduction of flavor. FIG. 5 shows the comparison of the GC profiles of soy flour, filtered retentate and diafiltered retentate and it was apparent that microfiltration alone resulted in only a slight reduction in the volatile components. FIG. 6 shows the comparison of the GC profiles of soy flour, diafiltered retentate and permeate and it was apparent that that volatiles removed during microfiltration and diafiltration were indeed being lost in the permeate. Statistical analysis ($p<0.001$) on the peak areas of the GC profiles showed a significant difference between that of the microfiltered and the diafiltered retentate. The results of this example suggest that microfiltration alone was not effective in removing the flavor from soy flour and in fact diafiltration was necessary to significantly reduce the volatile components in soy flour and that the flavor reduction after diafiltration was nearly 90% based on the mean peak areas in the profiles.

Example 8

While Example 7 based GC analysis suggest the effective removal of flavor compounds after microfiltration and diafiltration, the importance of sensory evaluation cannot be stressed enough. Sensory evaluations for aroma and flavor were completed for soy flour, commercial soy isolate and concentrate made with pectinase and crystalzyme. The responses for first detected aroma included beany, corn meal, musty and toasted while the responses for the first detected flavor included beany, bitter, chalky and astringent. The results of this sensory evaluation are presented in Table 3.

TABLE 3

| Sample | Mean Aroma | Mean Flavor |
|---|---|---|
| Soy Flour | 56.7[a] | 50.2[d] |
| Supro 1610 | 53.1[ab] | 50.8[d] |
| MSC (Pectinase) | 45.8[b] | 35.7[e] |
| MSC (Crystalzyme) | 29.6[c] | 35.5[e] |

Means with the same letter are not significantly different ($p < 0.05$).

Figure 7:
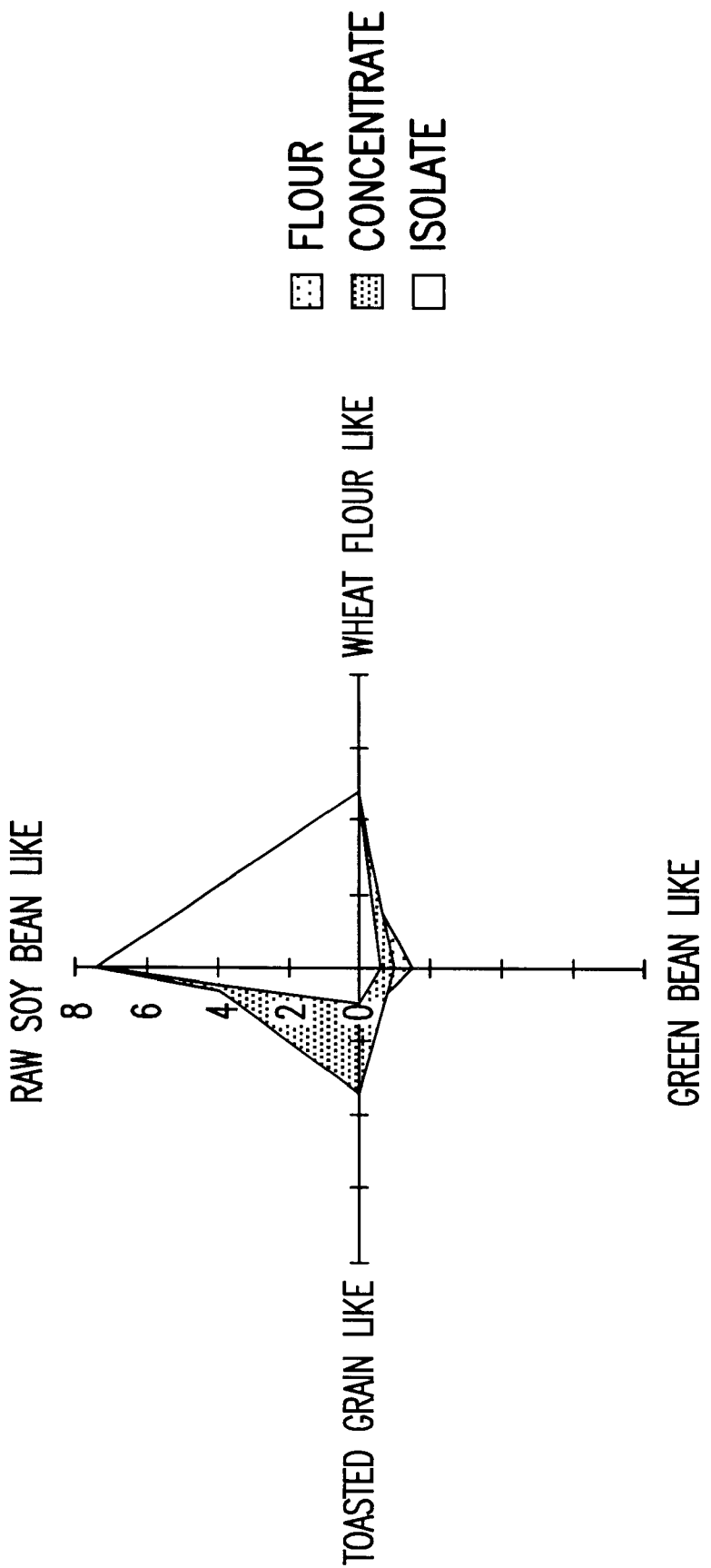
FIG. 7 is a spider plot describing the aroma of Soy Flour, Membrane Soy Concentrate and Commercial Soy Isolate.
Figure 8:
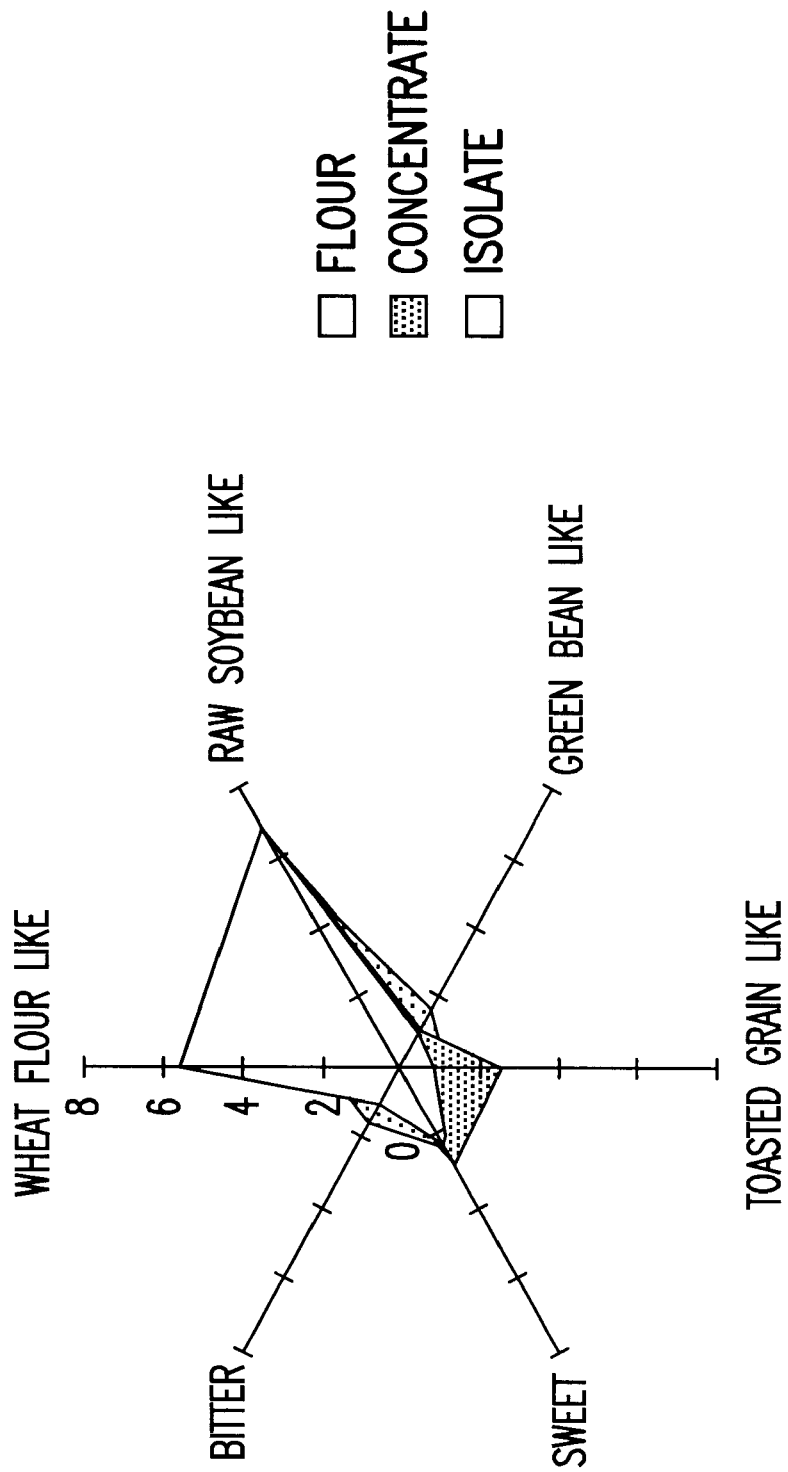
FIG. 8 is a spider plot describing the flavor of Soy Flour, Membrane Soy Concentrate (produced via the invention) and Commercial Soy Isolate.

From the scores in Table 3 it is clear that the general aroma and flavor differences among soy flour, soy isolate and the two membrane concentrates were noticeable to untrained human subjects. Based on this information, a more detailed descriptive sensory evaluation of soy flour, commercial soy isolate and the membrane soy concentrate processed with crystalzyme was undertaken using trained human subjects. The panelists were chosen based on their stability to identify the four basis tastes of sweet, sour, salty and bitter. The panelists were then asked to evaluate the aroma and flavor using descriptors which had been gathered from literature and preliminary discussions with the panelists. The use of standard samples helped to achieve agreement among the panelists on the definitions and relative importance of each descriptor. The chosen aroma descriptors included wheat flour like, raw soybean like, green bean like and toasted grain like. Flavor by mouth descriptors included wheat flour like, raw soybean like, green bean like, toasted grain like, sweet and bitter. FIG. 7 shows that the membrane soy concentrate was evaluated to possess a 'toasted grain' aroma and flavor while FIG. 8 shows that the membrane soy concentrate possessed the least 'soy bean' taste. This example therefore suggests that the absence of soy volatiles believed to contribute to the typical soybean aroma and flavor are perceived by both trained and untrained human panelists.

Example 9

Solutions of varying solids concentration in three different batches were used in the production of membrane soy concentrate so as to be able to optimize the microfiltration and diafiltration process outlined for the concentration of soy proteins. Batch I used 9.9 pounds of defatted soy flour diluted in 198 pounds of water so as to give a concentration of 5% w/w in a steam jacketed kettle to which 810 milliliters of the enzyme Crystalzyme 100XL was added at a ratio of 0.9% v/v. The crystalzyme was obtained from Valley Research, Inc., South Bend, IN having a declared activity of 110,000 AJDU units/gram protein. The enzyme treatment was carried out in a steam jacketed kettle whose temperature was maintained between 37–420° C. for three hours. The solution was then pumpted through a membrane system using three porous stainless-steel tubular microfiltration membranes (60 inches×0.72 inches i.d. per membrane). Two such modules were used in parallel connection. In addition two single pass tubular microfiltration membranes (60 inches×1.25 inches i.d. per membrane) were also used in conjunction so as to increase the surface area and capacity. The membranes were supplied by Graver Separations, Inc., Seneca, S.C. The retentate was returned to the steam jacketed kettle and the permeate was collected as shown in FIG. 1. The permeate flux at the start of the microfiltration process was 47.93 gallons/sq.ft./day at 104° F. The inlet pressure was 56 psi and the outlet pressure was 34 psi. 90 pounds of water was collected a the permeate end to mark the end of microfiltration. The permeate flux at the end of microfiltration was 36.20 gallons Isq.ft./day at 119° F. The inlet pressure was 74 psi and the outlet pressure was 50 psi. Diafiltration was continued as a continuous feed and bleed process wherein 100 pounds of distilled water was added in three batches of 35 pounds, 35 pounds and 30 pounds respectively. The permeate flux at the start of diafiltration was 30.93 gallons/sq.ft./day at 112° F. The inlet and outlet pressures were 74 psi and 50 psi. The collection of 100 pounds permeate marked the end of diafiltration. The permeate flux was 27.12 gallons/ sq.ft./day at 118° F. The inlet and outlet pressures were 76 psi and 52 psi respectively. The pump was shut off after diafiltration and the retentate was collected for further processing. The pH of the retentate (6.20) was adjusted to pH 9.0 with few drops of 50% sodium hydroxide and stirred continuously to increase protein solubility. The supernatant was then freeze dried to obtain a flaky powder that was used for further analysis.

Batch II used 19.8 pounds of defatted soy flour diluted in 198 pounds of water so as to give a concentration of 10% w/w in a steam jacketed kettle to which 810 milliliters of the enzyme Crystalzyme 100XL was added at a ratio of 0.9% v/v. The crystalzyme was obtained from Valley Research, Inc., South Bend, Ind. having a declared activity of 110,000 AJDU units/gram protein. The enzyme treatment was carried out in a steam jacketed kettle whose temperature was maintained between 37–420° C. for three hours. The solution was then pumped through a membrane system using three porous stainless-steel tubular microfiltration membranes (60 inches×1.25 inches i.d. per membrane) were also used in conjunction so as to increase the surface area and capacity. The membranes were supplied by Graver Separations, Inc., Seneca, S.C. The retentate was returned to the steam jacketed kettle and the permeate was collected as shown in FIG. 1. The permeate flux at the start of the microfiltration process was 45.77 gallons/sq.ft./day at 105° F. The inlet pressure was 46 psi and the outlet pressure was 28 psi. 90 pounds of water was collected at the permeate end to mark the end of microfiltration. The permeate flux at the end of microfiltration was 24.18 gallons/sq.ft./day at 119° F. The inlet pressure was 55 psi and the outlet pressure was 30 psi. Diafiltration was continued as a continuous feed and bleed process wherein 100 pounds of distilled water was added in three batches of 35 pounds, 35 pounds and 30 pounds respectively. The permeate flux at the end of diafiltration was 16.78 gallons/sq.ft./day at 110° F. The inlet and outlet pressures were 55 psi and 30 psi. The collection of 100 pounds permeate marked the end of diafiltration. The permeate flux was 11.69 gallons/sq.ft./day at 119° F. The inlet and outlet pressures were 70 psi and 46 psi respectively. The pump was shut off after diafiltration and the retentate was collected for further processing. The pH of the retentate (6.25) was adjusted to pH 9.0 with few drops of 50% sodium hydroxide and stirred continuously to increase protein solubility. The solution was then centrifuged at 2000×g for 20 minutes to remove the insoluble solids. The supernatant was then freeze dried to obtain a flaky powder that was used for further analysis.

Batch III used 22.6 pounds of defatted soy flour diluted in 180.8 pounds of water so as to give a concentration of 12.5% w/w in a steam jacketed kettle to which 739.6 milliliters of the enzyme Crystalzyme 100XL was added at a ratio of 0.9% v/v. The crystalzyme was obtained from Valley Research, Inc., South Bend, Ind. having a declared activity of 110,000 AJDU units/gram protein. The enzyme treatment was carried out in a steam jacketed kettle whose temperature was maintained between 37–420° C. for three hours. The solution was the pumped through a membrane system using three porous stainless-steel tubular microfiltration membranes (60 inches×0.72 inches i.d. per membrane). Two such modules were used in parallel connection. In addition two single pass tubular microfiltration membranes (60 inches× 1.25 inches i.d. per membrane) were also used in conjunction so as to increase the surface area and capacity. The membranes were supplied by Graver Separations, Inc., Seneca, S.C. The retentate was returned to the steam jacketed kettle and the permeate was collected as shown in FIG. 1. The permeate flux at the start of the microfiltration process was 29.51 gallons/sq.ft./day at 106° F. The inlet pressure was 80 psi and the outlet pressure was 43 psi. 90 pounds of water was collected at the permeate end to mark the end of microfiltration. The permeate flux at the end of microfiltration was 18.75 gallons/sq.ft./day at 116° F. The inlet pressure was 81 psi and the outlet pressure was 53 psi. Diafiltration was continued as a continuous feed and bleed process wherein 90 pounds of distilled water was added in three batches of 30 pounds each. The permeate flux at the start of diafiltration was 16.44 gallons/sq.ft./day at 109° F. The inlet and outlet pressures were 78 psi and 50 psi. The collection of 90 pounds permeate marked the end of diafiltration. The permeate flux was 5.86 gallons/sq.ft./day at 1180° F. The inlet and outlet pressures were 80 psi and 52 psi respectively. The pump was shut off after diafiltration and the retentate was collected for further processing. The pH of the retentate (6.00) was adjusted to pH 9.0 with few drops of 50% sodium hydroxide and stirred continuously to increase protein solubility. The solution was the centrifuged at 2000×g for 20 minutes to remove the insoluble solids. The supernatant was then freeze dried to obtain a flaky powder that was used for further analysis.

Figure 9:
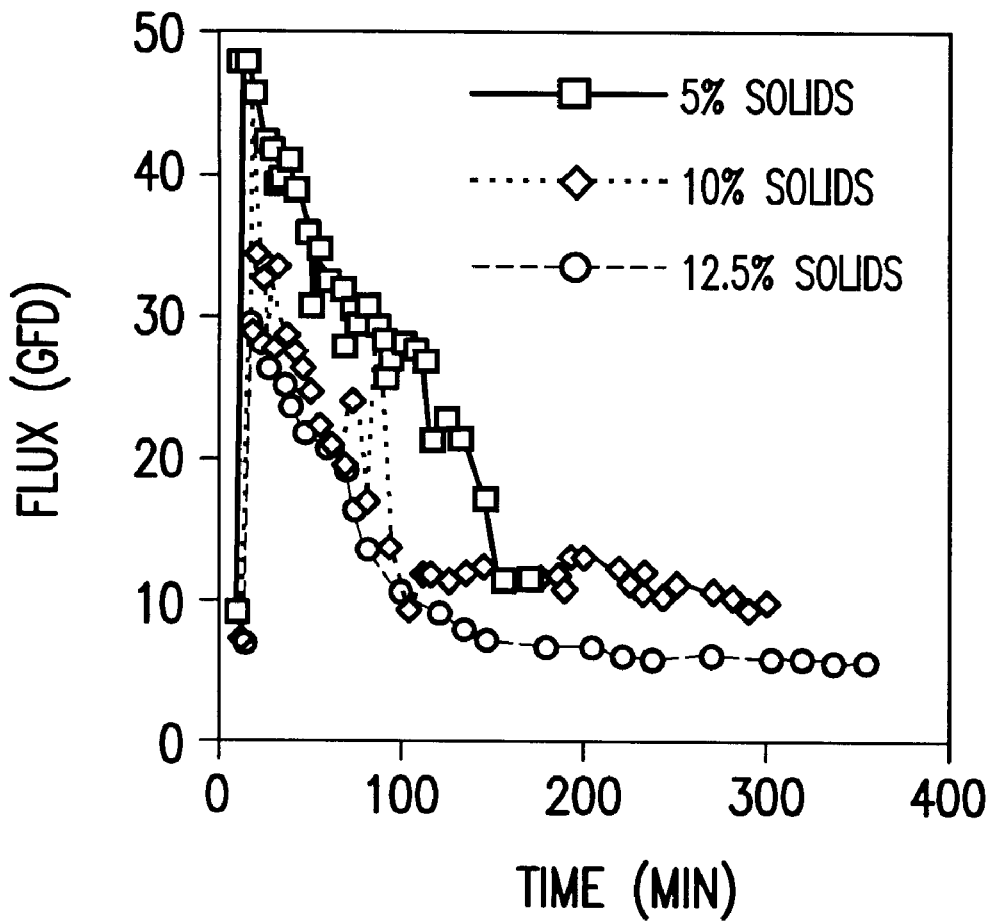
FIG. 9 is a graph which shows the effect of solids concentration on flux.

Table 3 shows the compositional analysis constituting of protein, carbohydrate, ash and moisture of soy concentrate produced in the three batches. Table 4 an FIG. 9 show the effect of solids concentration on the flux, processing time and permeability.

TABLE 3

| Batch | % Protein | % Carbohydrate | % Ash |
|---|---|---|---|
| One | 78.3[a] | 4.01[a] | 4.73[a] |
| Two | 78.2[a] | 4.77[a] | 4.89[a] |
| Three | 76.1[a] | 3.20[b] | 7.89[b] |

Means with the same letter are not significantly different (p < 0.05).

TABLE 4

| Initial Solids Concentration | Process Status | Time (min) | Flux (GFD) | Permeability* |
|---|---|---|---|---|
| 5% | Initial | 16.52 | 47.93 | 0.26 |
| | End of Microfiltration | 49.95 | 36.20 | 0.14 |
| | Start of Diafiltration | 53.05 | 30.93 | 0.12 |
| | End of Diafiltration | 112.17 | 27.12 | 0.10 |
| 10% | Initial | 19.39 | 45.77 | 0.30 |
| | End of Microfiltration | 74.68 | 24.18 | 0.14 |
| | Start of Diafiltration | 80.45 | 16.78 | 0.10 |
| | End of Diafiltration | 233.18 | 11.69 | 0.05 |
| 12.5% | Initial | 17.39 | 29.51 | 0.10 |
| | End of Microfiltration | 68.88 | 18.75 | 0.07 |
| | Start of Diafiltration | 74.77 | 16.44 | 0.06 |
| | End of Diafiltration | 301.25 | 5.86 | 0.02 |

*Permeability = Flux (LMH)/Pressure (kPa)

This example suggest that doubling the initial solids concentration is time effective with a marginal decrease in flux and permeability. However, any further increase in the solids concentration is associated with a steep decrease in flux and permeability and a considerable increase in processing time. Also, doubling the solids concentration does not alter the composition of the membrane soy concentrate produced.

Example 10

19.8 pounds of defatted soy flour was diluted in 198 pounds of distilled water to give a 10% w/w solution to which 810 milliliters of the enzyme Crystalzyme 100XL was added at a ratio of 0.9% v/v. The crystalzyme was obtained from Valley Research, Inc., South Bend, Ind. having a declared activity of 110,000 AJDU units/gram protein. The enzyme treatment was carried out in a steam jacketed kettle whose temperature was maintained between 37–42° C. for three hours. The solution was then pumped through a membrane system using three porous stainless-steel tubular microfiltration membranes (60 inches×0.72 inches i.d. per membrane). Two such modules were used in parallel connection. In addition two single pass tubular microfiltration membranes (60 inches×1.25 inches i.d. per membrane) were also used in conjunction so as to increase the surface area and capacity The membranes were supplied by Graver Separations, Inc., Seneca, S.C. The retentate was returned to the steam jacketed kettle and the permeate was collected as shown in FIG. 1. 90 pounds of water was collected a the permeate end to mark the end of microfiltration. Diafiltration was continued as a continuous feed and bleed process wherein 100 pounds of distilled water was added in three batches of 35 pounds, 35 pounds and 30 pounds respectively. The pump was shut off after diafiltration and the retentate was collected for further processing. The pH of the retentate was adjusted to pH 9.0 with a few drops of 50% sodium hydroxide and stirred continuously to increase protein solubility. The solution was then centrifuged at 2000×g for 20 minutes to remove the insoluble solids. The supernatant was the freeze dried to obtain a flaky powder that was used for further analysis.

Five batches as outlined above were processed on different days and the results of the compositional analysis regarding protein, carbohydrate and ash are presented in Table 6.

TABLE 6

| Replicate | % Protein | % Carbohydrate | % Ash |
|---|---|---|---|
| One | 78.3[a] | 4.01[a] | 4.73[a] |
| Two | 78.9[a] | 3.67[a] | 4.86[a] |
| Three | 78.21[a] | 3.28[a] | 4.92[a] |
| Four | 80.56[a] | 5.78[b] | 5.67[b] |
| Five | 81.08[a] | 5.69[b] | 5.60[a] |

Means with the same letter are not significantly different ($p < 0.05$).

The example suggest that pilot plant scale processing consistently resulted in a membrane soy concentrate with identical protein composition. This strongly emphasized the reproducibility of the ultrafiltration system consisting of microfiltration and diafiltration in the production of membrane soy concentrate.

Example 11

Yields and recovery form an important characteristic while establishing the feasibility of a process. The theoretical yields were calculated based on the protein content of the soy flour using a mass balance ratio between the protein content and the mass of the different processing fractions which include microfiltered permeate, diafiltered permeate and the retentate. The percent distribution of protein in the different fractions of the five batches processed with 1 0% w/w solids concentration as outlined in Example 9 are calculated and presented in Table 7.

TABLE 7

| Replicate | Microfiltered Permeate | Diafiltered Permeate | Membrane Soy Concentrate |
|---|---|---|---|
| One | 15.66 | 12.56 | 71.78 |
| Two | 12.33 | 9.92 | 77.75 |
| Three | 10.9 | 8.46 | 80.64 |
| Four | 13.23 | 5.26 | 81.51 |
| Five | 7.3 | 5.38 | 87.32 |

This example suggests that the yield of protein as the membrane soy concentrate is 80% on an average. The yield reported in literature for soy protein isolates was 60% of the protein. Therefore, this process described here would significantly increase protein yields over current processes.

Example 12

Physical and chemical properties that affect the behavior of proteins in food systems during storage, processing, preparation and consumption are often referred to as functionality. Some examples of functional properties include solubility, hydration, emulsifying properties an surface hydrophobicity.

The approximate water hydration capacity is defined as grams of water bound per gram of dry protein and describes water-protein interactions. Information on the hydration capacity is important since water is an important constituent of all food systems. The water hydration capacity of soy flour, membrane soy concentrate and commercial isolate (Supra 1610) was determined by the method outlined by Quinn and Paton (1979), supra. Surface hydrophobicity is another water-protein interaction that defines that portion of the non-polar surface of the protein that makes contact with the surrounding bulk water. Surface hydrophobicity of the three soy protein samples were evaluated by the method outlined by Hyakawa and Nagai (1985), supra. The results of water hydration capacity an surface hydrophobicity and presented in Table 8.

TABLE 8

| Sample | Water Hydration Capacity | Surface Hydrophobicity |
|---|---|---|
| Soy Flour | 2.35[a] | 10.52 |
| Membrane Soy Concentrate | 2.61[a] | 20.65 |
| Supro 1610 | 5.64 | 36.77 |

Means with the same letter are not significantly different ($p < 0.05$).

Figure 10:
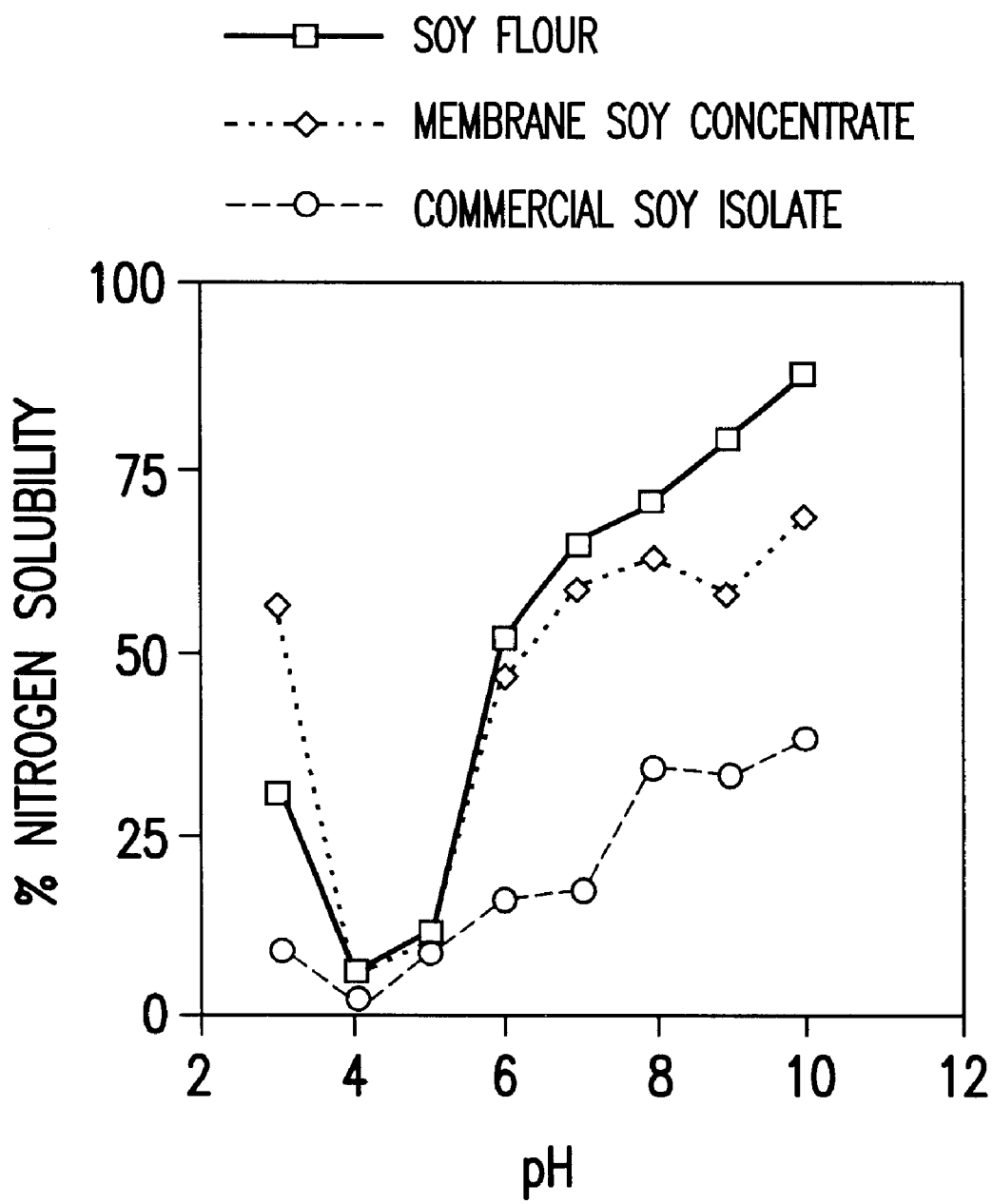
FIG. 10 is a graph showing the comparison of nitrogen solubility among Soy Flour, Membrane Soy Concentrate and Commercial Soy Isolate in the pH range of 3 to 10.

Insoluble proteins have very limited use in foods. Nitrogen solubility can be assumed to be reflective of protein solubility. Protein solubility is known to influence functional properties such as foaming, gelation and emulsification. Solubility is influenced by several conditions, pH being an important one. The nitrogen solubility of soy flour, membrane soy concentrate and commercial soy isolate was determined in the pH range between 3.0 and 10.0 by the method outlined by Bera and Mukherjee (1989), supra and is presented FIG. 10.

Ultrafiltration in the case of the membrane soy concentrate does not seem to have disrupted the structures so as to bring about an increase in the hydration capacity. Acid modification in the commercial soy isolate seems to have contributed to a greater water hydration capacity and seems to have unfolded the protein molecule to a large extent resulting in increased exposure of hydrophobic groups to the probe. Statistical analysis of the nitrogen solubility means indicated that the isolate had the least solubility, irrespective of the influence of pH. Soy flour showed the highest solubility with the membrane soy concentrate following a lesser but similar pattern to that of soy flour. This example suggest that membrane processing used to concentrate soy proteins seems to leave the protein molecule intact with little denaturation.

Example 13

Figure 11:
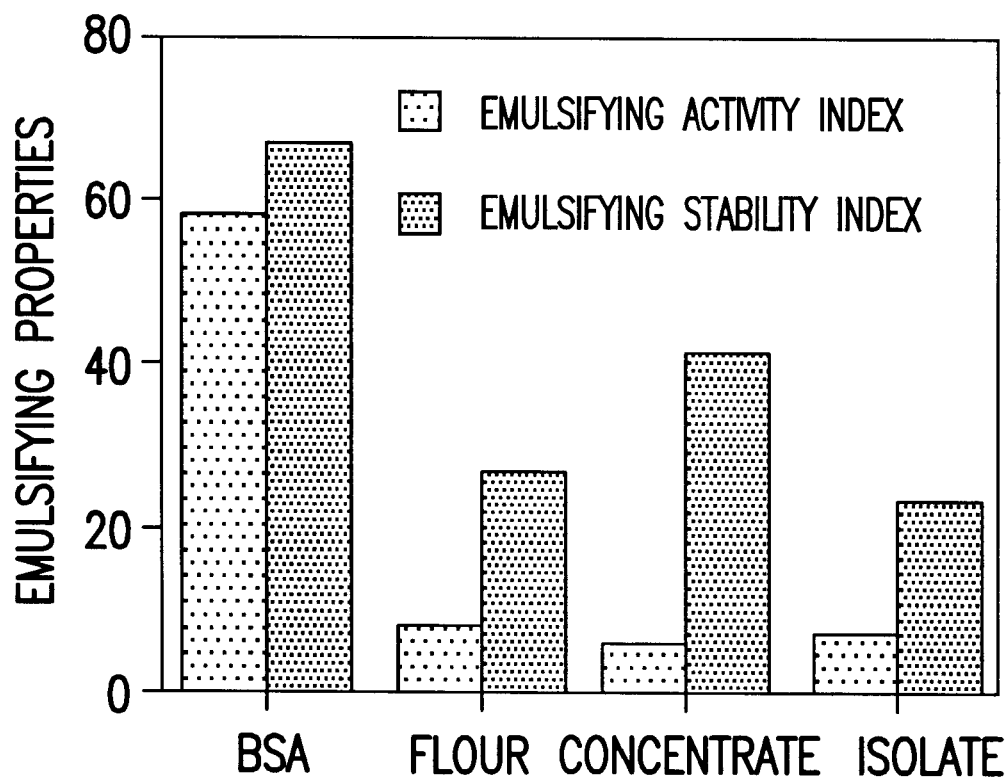
FIG. 11 is a bar graph comparing the emulsifying properties of Bovine Serum Albumin, Soy Flour, Membrane Soy Concentrate and Commercial Soy Isolate.

Emulsions are dispersions of one liquid in another and are of two types viz., oil in water e.g., milk and milk products and water in oil e.g. butter and margarine. Proteins are the emulsifiers of choice for oil in water emulsions because hey are edible and surface active. Emulsifiers are evaluated both in terms of emulsifying activity and emulsifying stability because an emulsifier is important to for an emulsion and also stabilize the emulsion after it has been formed. The emulsifying properties of soy flour, membrane soy concentrate and commercial soy isolate were evaluated by the method of Pearce an Kinsella (1978), supra and compared to that of an established protein emulsifier like bovine serum albumin. While there are several methods to evaluate the emulsifying properties, the method used here was based on the determination of the emulsifying activity index which relates the tubidity of the emulsion to the interfacial area of an emulsion and is expressed in m²/g. This method may not be completely accurate but it can be effectively used for qualitative comparison of emulsifying activities of different proteins. The results on the emulsifying activity and emulsion stability of the different soy proteins and bovine serum albumin are presently in FIG. 11. Statistical analysis on the emulsifying activity indices reveal a difference ($p<0.05$) among the three soy proteins with the flour exhibiting the highest index. This higher index may be attributed to higher solubility observed in soy flour. Data on the stability of emulsions formed as a function of time reveal that the membrane soy concentrate exhibited the highest index when compared to soy flour and soy isolate. This example suggest that the concentration of the proteins by ultrafiltration does not alter the emulsifying properties of the soy proteins when compared to that of native proteins in soy flour.

Example 14

Protein forms an integral constituent of the diet and quality is critical to support growth and development especially during the growing years of infancy and adolescence. The quality of proteins can be evaluated by several biological, chemical and enzymatic methods and is related to its amino acid composition. The protein quality of membrane soy concentrate, commercial soy isolate and casein was evaluated by comparing each of their amino acid compositions with the essential amino acid pattern recommended by FAO/WHO/UNU. 1985. Energy and protein requirements. Report of a Joint FAO/WHO/UNU expert consultation. World Health Organization Technical Rep. Ser. 724, WHO, Geneva for infants and the results are presented in Table 9.

TABLE 9

| Essential Amino Acid* | RDA** | Casein | Membrane Soy Concentrate | Commercial Soy Isolate |
|---|---|---|---|---|
| Histidine | 26 | 28.49 | 27.13 | 26.10 |
| Isoleucine | 46 | 50.20 | 49.08 | 46.46 |
| Leucine | 93 | 90.97 | 79.06 | 78.63 |
| Lysine | 66 | 71.62 | 54.46 | 63.03 |
| Methionine + Cysteine | 42 | 32.91 | 27.43 | 26.88 |
| Phenylalanine + Tyrosine | 72 | 102.56 | 92.35 | 89.46 |
| Threonine | 43 | 43.52 | 42.54 | 40.51 |
| Tryptophan | 17 | 9.53 | 12.08 | 11.92 |
| Valine | 55 | 60.61 | 50.35 | 53.72 |

*All values expressed as mg/gprotein.
**Recommended Dietary Allowances.

The essential amino acid profile of the membrane soy concentrate is not that different from the commercial soy isolate in comparison. The chemical score for each of the essential amino acids was calculated as follows:

$$\text{Chemical Score} = \frac{\text{mg amino acid/g test protein}}{\text{mg amino acid/reference protein}} \times 100$$

Based on the chemical scores calculated for the essential amino acid, the membrane soy concentrate when compared to casein is seen to lack marginally (2–5%) in isoleucine, threonine and histidine 14–15% less in leucine and valine with a significant lack in tyrosine (27%) and methionine (50%). This example suggests that the low methionine content of membrane soy concentrate is reflective of the limiting amino acids in soy flour from which the soy concentrate is processed. It seems as if membrane processing does not alter the amino acid pattern of the soy protein after concentration.

Example 15

The purpose of this example is to demonstrate that the process of this invention will reduce isoflavone levels in soy protein. Twenty five (25) pounds of soy protein concentrate was produced in a manner analgous to that of Example I. The isoflavone content of this material was determined using the method of Wang and Murphy, supra. For comparative purposes, soy protein isolate was purchased from Protein Technologies Inc. of St. Louis, Mo. Ten different lots of PTI material were tested and their results were averaged. The obtained results are depicted below in Table 10 (all values are expressed as mg/kg of protein on a dry weight basis).

TABLE 10

| Isoflavone % reduction | Soy Concentrate of Process | Control (PTI Isolate) |
|---|---|---|
| Daidzin (total) 71 | 146.11 | 498.5 |
| Glycitin (total) 82 | 18.57 | 103.4 |
| Genistin (total) 78 | 245.34 | 1,115 |
| Grand Total: | 409.2 | 1,716.9 |

Example 16

Using methodology similar to that of Example I, Twenty five (25) pounds of soy protein concentrate was produced. The phytate level of this material was evaluted by the method of McChance and Widdewson, supra. The soy protein concentrate had a phytate level of 0.026 w/w %. By contrast soy flour will typically have a phytate level of 2 to 3 w/w %.

We claim:

1. A process for the removal of isoflavones, phytate, and nucleic acids from soy protein comprising:
   a) contacting a source of soy protein with one or more enzymes possessing nuclease and phytase activity for a sufficient period of time to allow said enzymes to react with said source of soy protein;
   b) subjecting the soy protein source of step a) to ultrafiltration by passing said soy protein source through a metallic oxide ultrafiltration membrane at sufficient pressures, to maintain a permeability of the ultrafiltration membrane in the range of about 0.04 to 0.3 gallons/square feet/day (gfd), and for a sufficient period of time to create a retentate, containing soy protein;
   c) diluting said retentate with an aqueous solution to form a diluted retenate and passing said diluted retentate through a metallic oxide ultrafiltration membrane, and;
   d) collecting the diluted retentate, from which isoflavones, phytate, and nucleic acids have been removed.

2. The process according to claim 1 in which said enzyme is pectinase.

3. The process according to claim 1 in which said enzymatic treatment is carried out for a period of time of at least 3 hours.

4. The process according to claim 1 in which said source of soy protein is present in the enzymatic treatment at a level of about 5% w/w to about 12.5% w/w.

5. The process according to claim 1 in which said ultrafiltration membrane retains molecules having a molecular weight of 6500 daltons or greater.

6. The process according to claim 1 in which said ultrafiltration membrane has an initial permeability to water of about 0.55 to about 0.58 gfd.

7. The process according to claim 1 in which the enzyme treated soy protein source is present in the ultrafiltration at a concentration of about 5% w/w to about 20% w/w.

8. A process for producing soy protein concentrates and isolates comprising:
   a) in a reaction vessel contacting a soy protein source with a pectinase enzyme in an aqueous solution for a sufficient period of time to allow an enzymatic treatment of the soy protein source to occur;
   b) providing a tubular rigid porous housing, said housing having at least one metallic oxide ultrafiltration membrane secured along the inside surface of said tubular housing;
   c) subjecting the soy protein source of said reaction vessel to an ultrafiltration by pumping said contents into said tubular housing at sufficient pressures to maintain permeability of the ultrfiltration membrane in the range of about 0.04 to about 0.3 gfd, and for a sufficient period of time to create a soy protein containing retentate, and;
   e) diluting said retentate with additional aqueous solution and pumping said diluted retentate into said housing at sufficient pressures to create a second soy protein retentate.

9. A process according to claim 8 in which said pectinase possess at least 56 units of phytase activity per milliliter of enzyme.

10. The process according to claim 8 in which said enzymatic reaction is carried out for at least 3 hours.

11. The process according to claim 9 in which said soy protein source is present in the ultrafiltration at a level of about 5% w/w to about 20% w/w.

12. The process according to claim 8 in which the initial permeability of about 0.55 to about 0.58 gfd.

13. The process according to claim 8 in which said ultrafiltration membrane retains molecules having a molecular weight of 6500 daltons or greater.

14. A process for the removal of isofivones form soy protein comprising:
   a) contacting a source of soy protein with one or more enzymes possessing nuclease and phytase activity for a sufficient period of time to allow said enzymes to react with said source of soy protein;
   b) subjecting the soy protein source of step a) to ultrafiltration by passing said soy protein source through a metallic oxide ultrafiltration membrane at sufficient pressures, to maintain a permeability of the ultrafiltration membrane in the range of about 0.04 to 0.3 gallons/square feet/day (gfd), and for a sufficient period of time to create a retentate, containing soy protein;
   c) diluting said retentate with an aqueous solution to form a diluted retenate and passing said diluted retentate through a metallic oxide ultrafiltration membrane, and;
   d) collecting the diluted retentate, from which isoflavones, phytate, and nucleic acids have been removed.

15. A process for the removal of at least one impurity selected from the group consisting of isoflavones, phytate, and nucleic acids from soy protein comprising:
   a) contacting a source of soy protein with one or more enzymes possessing nuclease and phytase activity for a sufficient period of time to allow said enzymes to react with said source of soy protein;
   b) subjecting the soy protein source of step a) to ultrafiltration by passing said soy protein source through a metallic oxide ultrafiltration membrane at sufficient pressures, to maintain a permeability of the ultrafiltration membrane in the range of about 0.04 to 0.3 gallons/square feet/day (gfd), and for a sufficient period of time to create a retentate, containing soy protein;
   c) diluting said retentate with an aqueous solution to form a diluted retenate and passing said diluted retentate through a metallic oxide ultrafiltration membrane, and;
   d) collecting the diluted retentate, from which isoflavones, phytate, and nucleic acids have been removed.

16. A process for producing soy protein concentrates comprising:
   a) in a reaction vessel contacting a soy protein source with a pectinase enzyme in an aqueous solution for a sufficient period of time to allow an enzymatic treatment of the soy protein source to occur;
   b) providing a tubular rigid porous housing, said housing having at least one metallic oxide ultrafiltration membrane secured along the inside surface of said tubular housing;
   c) subjecting the soy protein source of said reaction vessel to an ultrafiltration by pumping said contents into said tubular housing at sufficient pressures to maintain permeability of the ultrfiltration membrane in the range of about 0.04 to about 0.3 gfd, and for a sufficient period of time to create a soy protein containing retentate, and;
   e) diluting said retentate with additional aqueous solution and pumping said diluted retentate into said housing at sufficient pressures to create a second soy protein retentate.

17. A process for producing soy protein isolates comprising:
   a) in a reaction vessel contacting a soy protein source with a pectinase enzyme in an aqueous solution for a sufficient period of time to allow an enzymatic treatment of the soy protein source to occur;
   b) providing a tubular rigid porous housing, said housing having at least one metallic oxide ultrafiltration membrane secured along the inside surface of said tubular housing;
   c) subjecting the soy protein source of said reaction vessel to an ultrafiltration by pumping said contents into said tubular housing at sufficient pressures to maintain permeability of the ultrfiltration membrane in the range of about 0.04 to about 0.3 gfd, and for a sufficient period of time to create a soy protein containing retentate, and;
   e) diluting said retentate with additional aqueous solution and pumping said diluted retentate into said housing at sufficient pressures to create a second soy protein retentate.

* * * * *